United States Patent
Larson

(10) Patent No.: US 11,510,368 B2
(45) Date of Patent: Nov. 29, 2022

(54) VEHICLE SUPPORTED IMPLEMENT FOR HANDLING SEPARATE LOADS INDEPENDENTLY

(71) Applicant: Enterprise Valley Farms LLC, Fruitland, WA (US)

(72) Inventor: Donald L. Larson, Fruitland, WA (US)

(73) Assignee: Enterprise Valley Farms LLC, Fruitland, WA (US)

( * ) Notice: Subject to any disclaimer, the term of this patent is extended or adjusted under 35 U.S.C. 154(b) by 17 days.

(21) Appl. No.: 17/039,203

(22) Filed: Sep. 30, 2020

(65) Prior Publication Data

US 2022/0095542 A1   Mar. 31, 2022

(51) Int. Cl.

| | |
|---|---|
| *A01D 87/12* | (2006.01) |
| *E04H 17/26* | (2006.01) |
| *E02F 3/34* | (2006.01) |
| *E02F 3/76* | (2006.01) |
| *E01H 5/06* | (2006.01) |
| *B66F 9/20* | (2006.01) |
| *B66F 9/22* | (2006.01) |
| *B66F 9/24* | (2006.01) |
| *E02F 3/36* | (2006.01) |

(52) U.S. Cl.
CPC .............. *A01D 87/127* (2013.01); *B66F 9/20* (2013.01); *B66F 9/22* (2013.01); *B66F 9/24* (2013.01); *E01H 5/061* (2013.01); *E02F 3/34* (2013.01); *E02F 3/3695* (2013.01); *E02F 3/7609* (2013.01); *E04H 17/265* (2013.01)

(58) Field of Classification Search
CPC . A01D 87/127; B66F 9/20; B66F 9/22; B66F 9/24; E02F 3/34; E02F 3/3695; E02F 3/7609; E01H 5/061; E04H 17/265
See application file for complete search history.

(56) References Cited

U.S. PATENT DOCUMENTS

| | | |
|---|---|---|
| 4,674,786 A | 6/1987 | Lynch |
| 5,240,365 A | 8/1993 | Lynch |
| 6,318,425 B1 | 11/2001 | Niemi |
| 6,622,761 B1 | 9/2003 | Paakkunainen |
| 6,971,696 B1 | 12/2005 | Koester |
| 7,913,930 B2 | 3/2011 | Theeuwen |
| 9,277,691 B2 | 3/2016 | Meyer |
| 10,701,865 B2 | 7/2020 | Borchers |
| 2011/0002757 A1* | 1/2011 | Taylor .................. A01D 87/127 414/24.5 |

* cited by examiner

*Primary Examiner* — Saul Rodriguez
*Assistant Examiner* — Ashley K Romano
(74) *Attorney, Agent, or Firm* — Randall Danskin P.S.

(57) ABSTRACT

A vehicle supported implement for handling separate loads independently, and related methods of use, are presented. The implement is configured to move a load, such as a hay bale, rotating the load radially about an axis, from a first position at a first elevation to a second position at a second elevation. It includes a first frame member and a second frame member pivotally connected to the first frame member at a joint. The axis of rotation intersects the joint normal to the back side of the first frame member and the second frame member rotates radially about the axis of rotation between the first position and the second position. The implement includes an actuator, such as a hydraulic cylinder, connected to the frame members to control the rotation. The implement includes an attachment feature on the back side to secure it to a vehicle.

15 Claims, 18 Drawing Sheets

VEHICLE SUPPORTED IMPLEMENT FOR HANDLING SEPARATE LOADS INDEPENDENTLY

BACKGROUND

Many situations involve moving multiple loads from one location to a second location. For example, when clearing a parking lot of snow, a snow plow operator engages a load of snow with a snow plow blade and moves it from wherever it has fallen to the edges of the parking lot or to central piles of snow. When transporting dirt, a front-loader operator scoops a load of dirt with a bucket affixed to the front-loader and then moves the load of dirt to the desired location. Some of the problems encountered in situations such as these include repetitious back-and-forth motion of moving multiple loads from one location to a second location requires expenditure of resources, such as time and fuel, and also causes some amount of wear and tear on the transport vehicle. Many efforts are made to reduce repetitious back-and-forth motion, to save time and fuel, and/or to reduce wear and tear on vehicles. The ability to transport multiple loads, separately and independently, reducing trips and repetitious back-and-forth would satisfy a long-felt need. The vehicle supported implement for handling separate loads independently described herein addresses these and other well-known, long-felt problems.

In the handling of hay bales, for example, a common chore is to stack multiple hay bales together in one stack or on a truck/trailer. The hay baler machinery is used to form and wrap the hay bales and each hay bale is dropped in the field wherever it is formed and wrapped. Multiple subsequent trips to the field are required to collect each hay bale and transport it to a more convenient location. The hay bales are gathered and stacked together, side-by-side, one next to another, or one on top of another, in one or more stacks or rows, in some cases, on a flatbed trailer. One by one, one after another, the operator moves the tractor forward toward a single hay bale and impales the hay bale with a bale spike. The hay bale is lifted off the ground and the tractor is driven to the secondary location. The hay bale is set down next to or on top of the previous hay bale. Then the operator goes to retrieve the next hay bale. Over and over again the process is repeated until all of the hay bales in the field are collected and gathered together in neat, convenient stacks. Some problems with this traditional approach to gathering and stacking hay bales are the repetitious back-and-forth motion of moving multiple hay bales from all over any given field to one or more pile or stack. It requires considerable expenditure of resources, such as time and fuel to gather and stack all of the hay bales. It also causes some amount of wear and tear on the tractor.

The ability to move and transport multiple loads in a single trip, multiple hay bales in this example, separately and independently, reduces the required number of trips through the field, reduces the time and fuel spent on gathering the hay bales, and reduces the repetitious back-and-forth motion and wear and tear on the vehicle. Using the implement disclosed herein, an operator reduces the number of trips through a field required to gather and stack all of the hay bales into a single area. This reduces the time and fuel spent on the task. This also reduces the repetitious back-and-forth motion and wear and tear on the vehicle.

It is estimated that proper use of the vehicle supported implement described herein, in the example of gathering and stacking hay bales, will save the operator approximately fifteen percent (15%) in time and fuel compared to that which is necessary to complete the same task using known traditional hay bale transport methods and devices. As described in further detail below, the operator of the implement approaches a first hay bale and impales it with a first bale spike. The first hay bale is lifted off the ground and rotated radially. The operator then approaches a second hay bale and, without needing to back up the vehicle and without unloading the first hay bale, impales the second hay bale with a second bale spike. This allows two hay bales, located apart from one another, to be engaged and lifted independently and separately from one another, and then transported together to a secondary location. The hay bales are unloaded together by rotating the first hay bale back to the initial starting position, level with the second hay bale, lowering the entire implement stacking the two hay bales side-by-side, and disengaging the load by backing the vehicle away from the hay bales. Alternatively, the hay bales are unloaded, separately and independently of one another, by reversing the process described above. The second hay bale is positioned at the desired location. The implement is lowered and the vehicle is backed away, unloading the second hay bale. The vehicle is then positioned such that the first hay bale is at its desired location. The load is rotated radially back to its initial starting position. The implement is lowered and the vehicle is backed away, unloading the first hay bale.

The vehicle supported implement described herein addresses the problems and challenges discussed herein in a similar manner for loads other than hay bales. The vehicle supported implement is used in a similar manner for loads that are snow, dirt, commodities, and/or other loads.

SUMMARY

A vehicle supported implement for handling separate loads independently is presented. The implement is configured to move a load, rotating radially, between a first position at a first elevation and a second position at a second elevation. The implement includes a first frame member with a back side and a front side opposite the back side. The implement includes a second frame member, also having a back side and a front side opposite the back side. The second frame member is pivotally connected to the first frame member at a pin joint. An axis of rotation intersects the pin joint normal to the back side of the first frame member. The second frame member rotates radially about the axis of rotation between the first position at the first elevation and the second position at the second elevation. The implement includes an actuator connected to the first frame member and the second frame member. The actuator controls the rotation of the second frame member, relative to the first frame member, between the first position and the second position. The implement includes an attachment feature on the back side of the first frame member. The attachment feature secures the implement to a vehicle.

In some embodiments, the implement includes an elongated, curved, guide channel with an interior pocket having a U-shaped cross-section. The interior pocket is complementary to an elongated, curved, alignment tab having an arcuate edge. In some embodiments, the guide channel is located on the first frame member and the alignment tab is located on the second frame member. In some embodiments they are reversed, with the guide channel located on the second frame member and the alignment tab on the first frame member. Either way, the elongated, curved, arcuate edge of the alignment tab slides within the interior pocket of the elongated, curved, guide channel as the second frame member rotates, relative to the first frame member, between the first position and the second position.

In some embodiments, the first frame member includes a mating surface disposed at a predetermined distance from the pin joint and the second frame member also includes a mating surface disposed at the same predetermined distance from the joint. The mating surface of the first frame member, or first mating surface, is sized and shaped to mate with the mating surface of the second frame member, or second mating surface. In some embodiments, a portion of one or both the first and/or second mating surface includes a bevel such that when the first mating surface mates with the second mating surface, a void or pocket is created at the bevel between them.

In some embodiments, the implement includes a third frame member. In some embodiments, the third frame member is substantially similar to the second frame member, having a back side and a front side opposite the back side. The third frame member is pivotally connected to the first frame member at a second pin joint. A second axis of rotation intersects the second joint normal to the back side of the first frame member. The third frame member rotates radially about the second axis of rotation between a third position at a third elevation and a fourth position at a fourth elevation. A second actuator is connected to the first frame member and the third frame member. The second actuator controls the rotation of the third frame member, relative to the first frame member, between the third position and the fourth position.

In some embodiments, the third elevation is equal to the first elevation. In other embodiments, the third elevation is not equal to the first elevation. In some embodiments, the fourth elevation is equal to the second elevation. In other embodiments, the fourth elevation is not equal to the second elevation.

In some embodiments, the implement includes a second elongated, curved, guide channel with an interior pocket having a U-shaped cross-section. The interior pocket of the second elongated, curved, guide channel is complementary to a second elongated, curved, alignment tab having an arcuate edge. In some embodiments, the second guide channel is located on the first frame member and the second alignment tab is located on the third frame member. In some embodiments they are reversed, with the second guide channel located on the third frame member and the second alignment tab on the first frame member. Either way, the elongated, curved, arcuate edge of the second alignment tab slides within the interior pocket of the elongated, curved, second guide channel as the third frame member rotates, relative to the first frame member, between the third position and the fourth position.

In some embodiments, the first frame member includes an auxiliary mating surface disposed at a second predetermined distance from the second pin joint and the third frame member also includes an auxiliary mating surface disposed at the same second predetermined distance from the second pin joint. The auxiliary mating surface of the first frame member, or first auxiliary mating surface, is sized and shaped to mate with and is complementary to the auxiliary mating surface of the third frame member, or third auxiliary mating surface. In some embodiments, a portion of one or both the first and/or third auxiliary mating surface includes a bevel such that when the first auxiliary mating surface mates with the third auxiliary mating surface, a second void or pocket is created at the bevel between them.

In some embodiments, the implement includes a tubular-shaped mounting socket extending from the back side of the first frame member, through the first frame member, to the front side of the first frame member. In some embodiments, the implement includes a tubular-shaped mounting socket extending from the back side of the second frame member, through the second frame member, to the front side of the second frame member. In some embodiments, the implement includes a tubular-shaped mounting socket extending from the back side of the third frame member, through the third frame member, to the front side of the third frame member. In some embodiments, the implement includes a load carrier mounted to one or more of the first frame member, the second frame member, and/or the third frame member. In some embodiments, the tubular mounting socket is sized and shaped to receive a back portion of the load carrier to mount the load carrier to the front side of the first frame member, the second frame member and/or the third frame member.

The actuator(s) of the implement may be, for example, but are not limited to, a hydraulic cylinder, an electric motor, a hydraulic motor, and/or a pneumatic apparatus. In some embodiments, the actuator(s) include gears, wheels, pulleys, and/or other machinery, linking, or pivoting components.

In some embodiments, the load carrier may be, for example, but are not limited to, a bale spike, a stabilizing spike, a bucket, a plow blade, and/or a fence post puller.

A method of using the implement is also presented. The method includes providing an implement as discussed herein and releasably securing the first frame member of the implement to a vehicle and connecting the actuator to a power source and a controller. A first load carrier is mounted to the front side of the first frame member and a second load carrier is mounted to the front side of the second frame member. The implement is positioned such that the first and second load carriers are horizontal and elevated relative to a surface beneath the implement such that forward and backward motion of the implement is not impeded by the surface below the implement. Using the actuator, the second frame member is rotated to the first position at the first elevation. The implement is moved forward toward a second load and the second load is engaged with second load carrier. Using the actuator, the second frame member, with the second load engaged, is rotated to the second position at the second elevation. The implement is moved forward toward a first load and the first load is engaged with the first load carrier. The implement may thereafter be raised vertically. In some embodiments, the second frame member, with the second load engaged, is rotated by the actuator back to the first position at the first elevation.

In some embodiments, when the loads are to be deposited separately, the method of using the implement includes lowering the implement so that the first load rests on a supporting surface such as the ground or a truck/trailer. The first load is disengaged from the first load carrier by moving the implement away from the first load. The second frame member, with the second load engaged, may then be rotated to the first position at the first elevation. The second load is disengaged from the second load carrier by repeating the procedure.

Reference to the word "vehicle" is not intended to be limiting, but instead intended to be a generic term for any vehicle capable of engaging and moving a load. For example, farm tractors, skid steers, front loaders, trucks, UTVs, and ATVs would all fall within the generic word "vehicle" as used herein. It is well known in the art for a vehicle to use interchangeable accessories and implements. A bale spike, a stabilizing spike, a bucket, a plow blade, and a fence post puller are all examples of load carriers known in the art and others may be available in the future. Examples of vehicle accessories and/or or implements include the hay bale spike accessories/implements of U.S. Pat. Nos. 4,674,786, 5,240,365, 6,971,696, and 10,701,865, the delimbing accessories/implements of U.S. Pat. Nos. 6,318,425 and 6,622,761, and the spray boom of U.S. Pat. No. 7,913,930.

To be used together, a vehicle must include, or be adapted to include, an attachment feature complementary to the attachment feature of the implement, or the attachment feature of the implement must include, or be adapted to include, an attachment feature complementary to the attachment feature of the vehicle. For example, in some embodiments as shown in FIGS. 10 and 11, the implement includes an attachment feature on the back side of the first frame member that includes a pair of heavy duty hooks and alignment rod holes. A complementary attachment feature on the front of a vehicle would include heavy duty bars complementary to the heavy duty hooks and similarly aligned rod holes complementary to the alignment rod holes and an elongated rod inserted through both sets of aligned rod holes. Many other means for attaching an implement to a vehicle are well known in the art and/or may be easily determined by a person of ordinary skill in the art. In some embodiments, the vehicle also includes a power source to provide power to the actuator(s) and/or a controller to control operation of the actuator(s).

One aspect relates to a vehicle supported implement for handling separate loads independently. The implement comprises a first frame member having a back side and a front side opposite the back side. The implement also comprises a second frame member having a back side and a front side opposite the back side. The second frame member is pivotally connected to the first frame member at a joint such that an axis of rotation intersects the joint normal to the back side of the first frame member. The second frame member is rotatable radially about the axis of rotation between a first position at a first elevation and a second position at a second elevation. The implement also comprises an actuator connected to the first frame member and connected to the second frame member and configured to control the radial rotation of the second frame member relative to the first frame member between the first position and the second position. The implement also comprises an attachment feature on the back side of the first frame member for securing the implement to a vehicle.

Another aspect relates to an implement as described herein, wherein one of the first frame member or the second frame member further comprises an elongated, curved, guide channel defining an interior pocket with a U-shaped cross-section, and the other one of the first frame member or the second frame member further comprises an elongated, curved, alignment tab having an arcuate edge, the elongated, curved, arcuate edge of the alignment tab being sized and shaped complementary to the interior pocket of the elongated curved guide channel, and sized and shaped such that the elongated, curved, arcuate edge of the alignment tab slidingly engages within the interior pocket of the elongated, curved, guide channel as the second frame member rotates between the first position and the second position.

Another aspect relates to an implement as described herein, further comprising a tubular-shaped mounting socket extending from the back side of the first frame member, through the first frame member, to the front side of the first frame member.

Another aspect relates to an implement as described herein, further comprising a tubular-shaped mounting socket extending from the back side of the second frame member, through the second frame member, to the front side of the second frame member.

Another aspect relates to an implement as described herein, further comprising a load carrier mounted to the first frame member, the second frame member, or both the first frame member and the second frame member.

Another aspect relates to an implement as described herein, wherein the tubular mounting socket is sized and shaped to receive a back portion of a load carrier to mount the load carrier to the front side of the first frame member, the second frame member, or both the first and second frame members.

Another aspect relates to an implement as described herein, wherein the tubular mounting socket is sized and shaped to receive a back portion of a load carrier to mount the load carrier to the front side of the first frame member, the second frame member, or both the first and second frame members.

Another aspect relates to an implement as described herein, wherein the first frame member further comprises a first mating surface disposed at a predetermined distance from the joint, and the second frame member further comprises a second mating surface disposed at the predetermined distance from the joint, and the first mating surface is sized and shaped to mate with and is complementary to the second mating surface.

Another aspect relates to an implement as described herein, wherein a portion of the first mating surface, a portion of the second mating surface, or both a portion of the first mating surface and a portion of the second mating surface defines a bevel such that when the first mating surface mates with the second mating surface, a void is created at the bevel between the first mating surface and the second mating surface.

Another aspect relates to an implement as described herein, wherein the actuator is a hydraulic cylinder.

Another aspect relates to an implement as described herein, wherein the actuator is an electric motor.

Another aspect relates to an implement as described herein, wherein the actuator is a pneumatic cylinder.

Another aspect relates to an implement as described herein, wherein the actuator is a hydraulic motor.

Another aspect relates to an implement as described herein, wherein the load carrier is any one or more of a bale spike, a stabilizing spike, a bucket, a plow blade, and/or a fence post puller.

Another aspect relates to an implement as described herein, wherein the load carrier is any one or more of a bale spike, a stabilizing spike, a bucket, a plow blade, and/or a fence post puller.

Another aspect relates to an implement as described herein, further comprising a third frame member having a back side and a front side opposite the back side. The third frame member is pivotally connected to the first frame member at a second joint such that a second axis of rotation intersects the second joint normal to the back side of the first frame member. The third frame member is rotatable radially about the second axis of rotation between a third position at a third elevation and a fourth position at a fourth elevation. The implement further comprises a second actuator connected to the first frame member and connected to the third frame member and configured to control the radial rotation of the third frame member relative to the first frame member between the third position and the fourth position.

Another aspect relates to a method of using a vehicle supported implement for handling separate loads independently. The method comprises providing an implement as described herein; securing the first frame member of the implement to a vehicle using the attachment feature; mounting a first load carrier to the front side of the first frame member; mounting a second load carrier to the front side of the second frame member; positioning the implement such that the first load carrier and the second load carrier are horizontal and elevated relative to a surface below the implement sufficient that forward and backward motion of the implement is not impeded by the surface below the implement; rotating the second frame member to the first position at the first elevation; moving the implement toward a second load; engaging the second load with the second load carrier; rotating the second frame member to the second position at the second elevation; moving the implement toward a first load; engaging the first load with the first load carrier; and raising the implement vertically.

Another aspect relates to a method of using an implement as described herein, further comprising operably connecting the actuator to a power source and controller.

Another aspect relates to a method of using an implement as described herein, further comprising lowering the implement; disengaging the first load from the first load carrier; moving the implement away from the first load; rotating the second frame member to the first position at the first elevation; disengaging the second load from the second load carrier; and moving the implement away from the second load.

Another aspect relates to a vehicle supported implement for handling separate loads independently. The implement comprises a first frame member having a back side and a front side opposite the back side. The implement also comprises a second frame member having a back side and a front side opposite the back side. The second frame member is pivotally connected to the first frame member at a joint such that the second frame member is rotatable radially between a first position at a first elevation and a second position at a second elevation. The implement also comprises a means for actuating radial rotation of the second frame member relative to the first frame member between the first position and the second position. The means for actuating radial rotation is connected to the first frame member and connected to the second frame member. The implement also comprises an attachment feature on the back side of the first frame member for securing the implement to a vehicle.

The foregoing paragraphs of the Summary are intended to be illustrative and are not meant in a limiting sense. Many possible embodiments may be made and will be readily evident upon a study of this specification and accompanying drawings comprising a part thereof. Various features and subcombinations may be employed without reference to other features and subcombinations. Other objectives, benefits, and/or advantages will become apparent from the description set forth in this specification taken in connection with the accompanying drawings, wherein is set forth by way of illustration and example, one or more embodiment and various features thereof.

BRIEF DESCRIPTION OF THE DRAWINGS

An implement, illustrative of the best mode in which the applicant has contemplated applying the principles, is set forth in this specification and is shown in the drawings. The drawings are not intended to limit the scope of the implement in any way. The drawings shall be interpreted as illustrative and not in a limiting sense.

FIG. 2 is a front view of an implement, with a second frame member at a first position at a first elevation.

FIG. 3 is a front view of an implement, similar to that which is shown in FIG. 2, with a second frame member at a second position at a second elevation.

FIG. 4 is a front view of an implement, with a second and a third frame member, the second frame member at a first position at a first elevation and the third frame member at third position at a third elevation.

FIG. 5 is a front view of an implement, similar to that which is shown in FIG. 4, with a second and a third frame member, the second frame member at a second position at a second elevation and the third frame member at a fourth position at a fourth elevation.

FIG. 6 is a perspective view of the front of an implement.

FIG. 7 is a perspective view of the front of an implement, similar to that which is shown in FIG. 6, showing rotational movement of the second frame member.

FIG. 9 is a perspective view of a second frame member of an implement.

FIG. 15 is a front view of an implement, with a second frame member at a first position at a first elevation, showing a geared actuator.

FIG. 16 is a front view of an implement, similar to that which is shown in FIG. 15, with a second frame member at a second position at a second elevation, showing a geared actuator.

FIG. 17 is a front view of an implement, with a second frame member at a first position at a first elevation, showing another variation of a geared actuator.

FIG. 18 is a front view of an implement, similar to that which is shown in FIG. 17, with a second frame member at a second position at a second elevation, showing another variation of a geared actuator.

DETAILED DESCRIPTION

Figure 1:
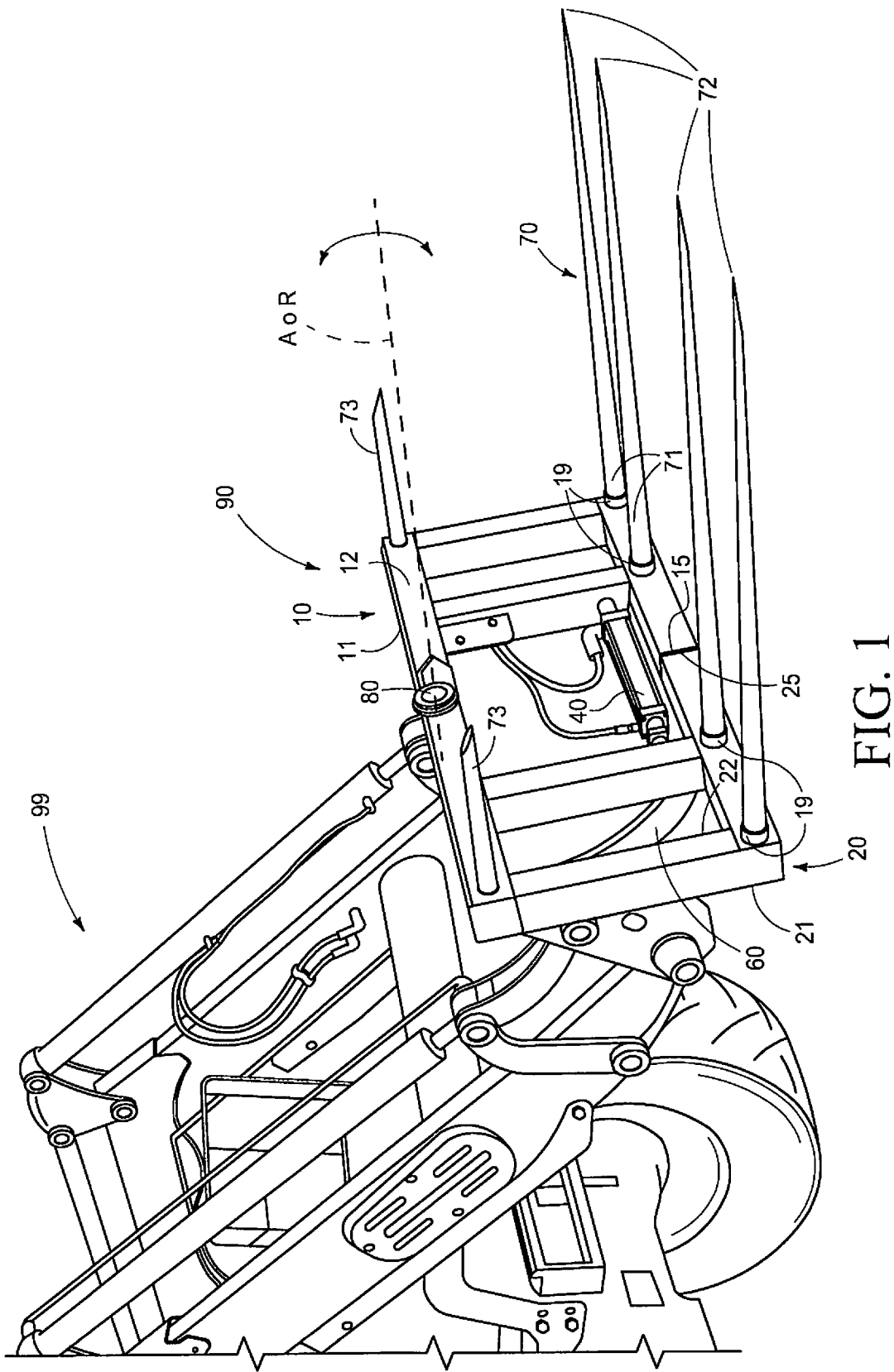
FIG. 1 is a perspective view of an implement for a vehicle attached to a front of a tractor.

In compliance with the statutes, the implement is disclosed herein and described in detail; however, it is to be understood that the disclosed embodiment(s) are merely examples, which may be embodied in various forms. Therefore, specific structural and functional details disclosed herein are not to be interpreted as limiting, but merely as a basis for understanding the claims and as a representative basis for teaching one skilled in the art to variously employ the features claimed in virtually any appropriate structure.

Referring to the Figures, a vehicle 99 supported implement 90 for handling separate loads independently is presented. The implement 90 includes a first frame member 10 having a back side 11 and a front side 12 opposite the back side 11. The implement 90 includes a second frame member 20, also having a back side 21 and a front side 22 opposite the back side 21. The second frame member 20 is pivotally connected to the first frame member 10 at a joint 80. An axis of rotation ("AoR") intersects the joint 80 normal to the back side 11 of the first frame member 10. The second frame member 20 rotates radially about the axis of rotation (indicated by the arrow shown in FIG. 1) between a first position 23 at a first elevation (shown in FIGS. 2, 4, 6, 10, 15, and 17) and a second position 24 at a second elevation (shown in FIGS. 3, 5, 7, 11, 16, and 18). Throughout the Figures, the implement 90 includes an actuator 40 connected to the first frame member 10 and connected to the second frame member 20. The actuator 40 is configured to control the rotation of the second frame member 20, relative to the first frame member 10, between the first position 23 and the second position 24. The implement 90 also includes an attachment feature 50 on the back side 11 of the first frame member 10 for securing the implement 90 to the vehicle 99.

Referring to FIG. 1, an implement 90 is shown attached to and supported by a vehicle 99. The implement 90 includes a first frame member 10 with a back side 11 and a front side 12. The implement 90 includes a second frame member 20, also having a back side 21 and a front side 22. The second frame member 20 is pivotally connected to the first frame member 10 at joint 80. An axis of rotation ("AoR") intersects the joint 80 normal to the back side 11 of the first frame member 10. The second frame member 20 rotates radially about the axis of rotation between a first position 23 at a first elevation (shown in FIGS. 2, 4, 6, 10, 15, and 17) and a second position 24 at a second elevation (shown in FIGS. 3, 5, 7, 11, 16, and 18). Still referring to FIG. 1, the implement 90 includes an actuator 40 connected to the first frame member 10 and connected to the second frame member 20. The actuator 40 is configured to control the rotation of the second frame member 20 between the first position 23 and the second position 24. The example shown in FIG. 1 includes load carriers 70 mounted to the front side 12 of the first frame member 10 and to the front side 22 of the second frame member 20. In the example shown in FIG. 1, the load carriers 70 include bale spikes 72 and stabilizing spikes 73.

Figure 2:
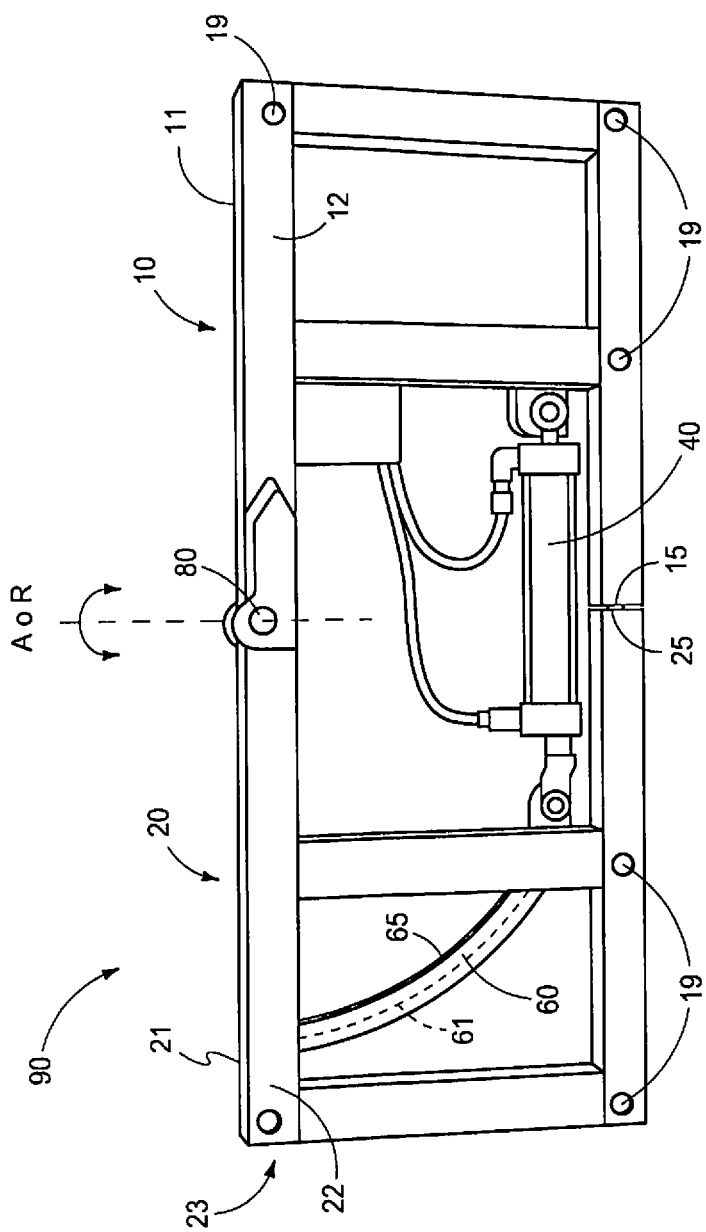
FIGS. 2-7, 9, and 15-18 are shown without load carriers.
Figure 3:
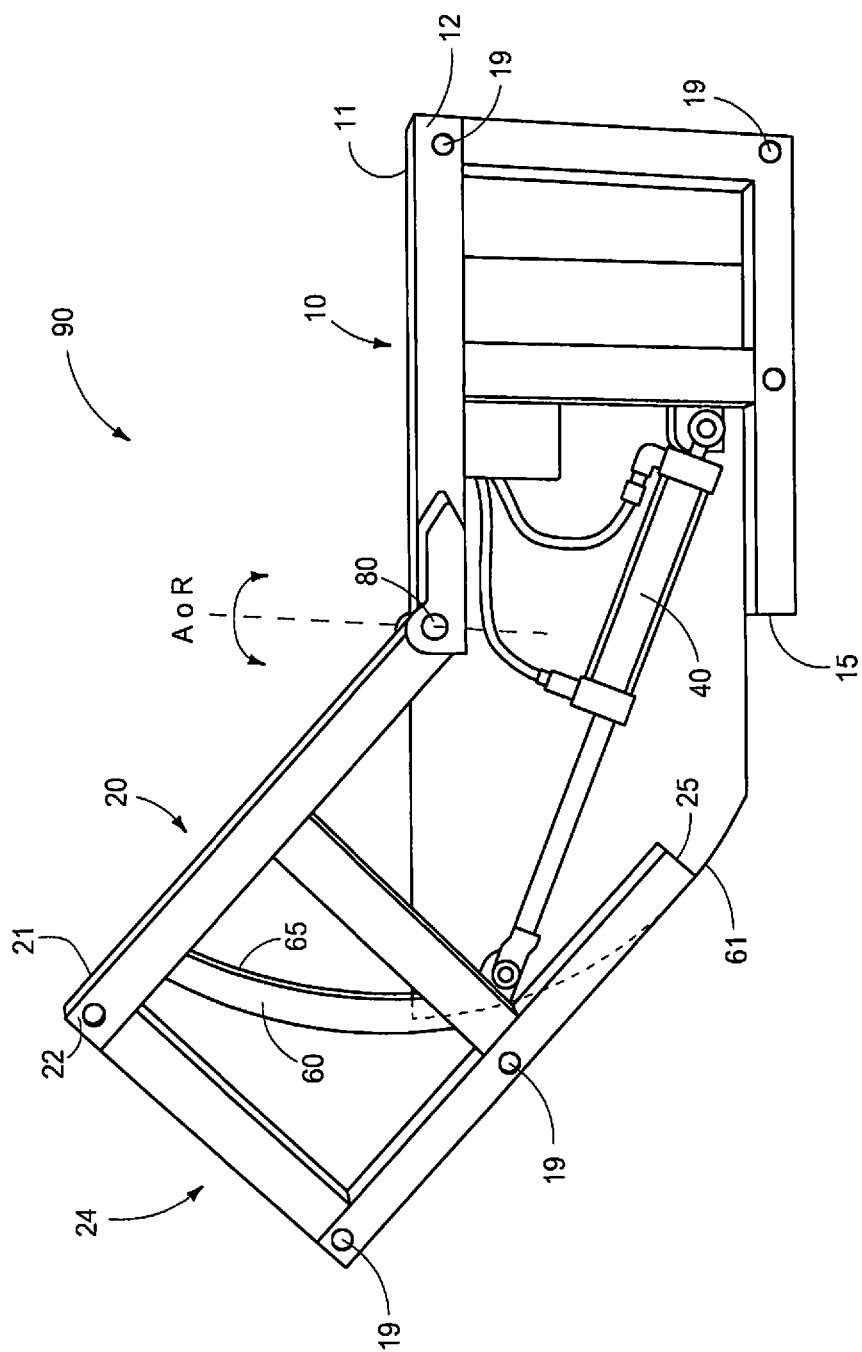

Referring to FIGS. 2 and 3, an implement 90 is shown separate and unattached from a vehicle 99 (not shown in FIGS. 2 and 3). The implement 90 includes a first frame member 10 with a back side 11 and a front side 12. In the example shown in FIGS. 2 and 3, the first frame member 10 is built of metal box beams. As shown in FIGS. 2 and 3, the first frame member 10 defines a top horizontal box beam and a bottom horizontal box beam with two vertical support box beams, each vertical support box beam connecting the top and bottom horizontal box beams to one another. The two vertical support box beams and the two horizontal box beams are welded together at adjacent end portions at approximately 90 degree angles to form a rectangular frame. The back side 11 of the first frame member 10 includes a sheet of plate metal extending across, and welded to, each of the two vertical and two horizontal box beams and extending to one side beyond the vertical support box beams. The first frame member 10 also defines a pair of sturdy, rigid, circular holes coaxially aligned such that a pin or bushing inserted therethrough forms the joint 80.

Still referring to FIGS. 2 and 3, the implement 90 includes a second frame member 20, having a back side 21 and a front side 22. In the example shown in FIGS. 2 and 3, the second frame member 20 is built of metal box beams. As shown in FIGS. 2 and 3, the second frame member 20 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The second frame member 20 defines a pair of sturdy, rigid, circular holes coaxially aligned such that a pin or bushing inserted therethrough forms the joint 80 so that the second frame member 20 is pivotally connected to the first frame member 10 at joint 80. A pin or bushing is simultaneously inserted through the coaxially aligned joint holes in the first frame member 10 and also through the coaxially aligned joint holes in the second frame member 20 to form the joint 80. An axis of rotation ("AoR") intersects the joint 80 normal to the back side 11 of the first frame member 10. The second frame member 20 rotates radially about the axis of rotation between a first position 23 at a first elevation (shown in FIG. 2) and a second position 24 at a second elevation (shown in FIG. 3).

Still referring to FIGS. 2 and 3, the implement 90 includes an actuator 40 connected to the first frame member 10 and the second frame member 20. The actuator 40 facilitates and controls the rotation of the second frame member 20 between the first position 23 and the second position 24. In the example shown in FIGS. 2 and 3, the actuator 40 is a hydraulic cylinder and is operably connected via hydraulic lines to a power source (not shown) and a controller (not shown). The implement 90 is configured to move a load, rotating the load radially, from the first position 23 at the first elevation (shown in FIG. 2) to the second position 24 at the second elevation (shown in FIG. 3). When a first load is engaged at the first frame member 10 and a second load is engaged at the second frame member 20, the first and second loads may be moved separately and independent of one another.

As shown in FIGS. 2 and 3, the second frame member 20 includes an elongated, curved, guide channel 60. The guide channel 60 defines an interior pocket 65 with a U-shaped cross-section. The interior pocket 65 and the curve of the guide channel 60 are sized and shaped to be complementary to an elongated, curved, alignment tab 61 having an arcuate edge. In the example shown in FIGS. 2 and 3, the sheet of plate metal at the back side 11 of the first frame member 10 includes an elongated, curved, alignment tab 61 along one edge extending to one side beyond the vertical support box beams. The curved, elongated, arcuate edge of the alignment tab 61 is sized and shaped to be complementary to the interior pocket 65 of the guide channel 60. The curved, elongated, arcuate edge of the alignment tab 61 rests at least partially within the interior pocket 65 of the guide channel 60. As shown in FIG. 2, when the second frame member 20 is in the first position 23 at the first elevation, the curved, elongated, arcuate edge of the alignment tab 61 of the first frame member 10 rests securely and entirely within the interior pocket 65 of the guide channel 60 of the second frame member. As shown in FIG. 3, when the second frame member 20 is in the second position 24 at the second elevation, the curved, elongated, arcuate edge of the alignment tab 61 is only partially within the interior pocket 65 of the guide channel 60 of the second frame member 20, but is not completely disengaged therefrom. The guide channel 60 and the alignment tab 61 work together in concert to keep the second frame member 20 and the first frame member 10 aligned, front to back, throughout movement of the second frame member 20 from the position 23 at the first elevation to the position 24 at the second elevation, while maintaining free rotational motion about the axis of rotation (AoR). The guide channel 60 and alignment tab 61 relieve some of the angular stresses on the joint 80 while allowing the second frame member 20 to rotate about the axis of rotation (AoR).

In the example shown in FIGS. 2 and 3, the guide channel 60 is located on the second frame member 20 and the alignment tab 61 is located on the first frame member 10. In some embodiments (not shown) they are reversed, with the guide channel 60 located on the first frame member 10 and the complementary alignment tab 61 on the second frame member 20. Either way, the curved, elongated, arcuate edge of the alignment tab 61 slides within the interior pocket 65 of the guide channel 60 as the second frame member 20 rotates between the first position 23 (shown in FIG. 2) and the second position 24 (shown in FIG. 3).

Still referring to FIGS. 2 and 3, the first frame member 10 includes a mating surface 15 disposed at a predetermined distance from the joint 80 and the second frame member 20 also includes a mating surface 25 disposed at the same predetermined distance from the joint 80. The mating surface 15 of the first frame member 10, or first mating surface 15, is sized and shaped to mate with and complementary to the mating surface 25 of the second frame member 20, or second mating surface 25.

In the example shown in FIGS. 2 and 3, the implement 90 includes one or more tubular-shaped mounting socket 19 extending from the back side 11 of the first frame member 10 through to the front side 12. In the example shown in FIGS. 2 and 3, the implement 90 also includes one or more tubular-shaped mounting socket 19 extending from the back side 21 of the second frame member 20 through to the front side 22.

Figure 4:
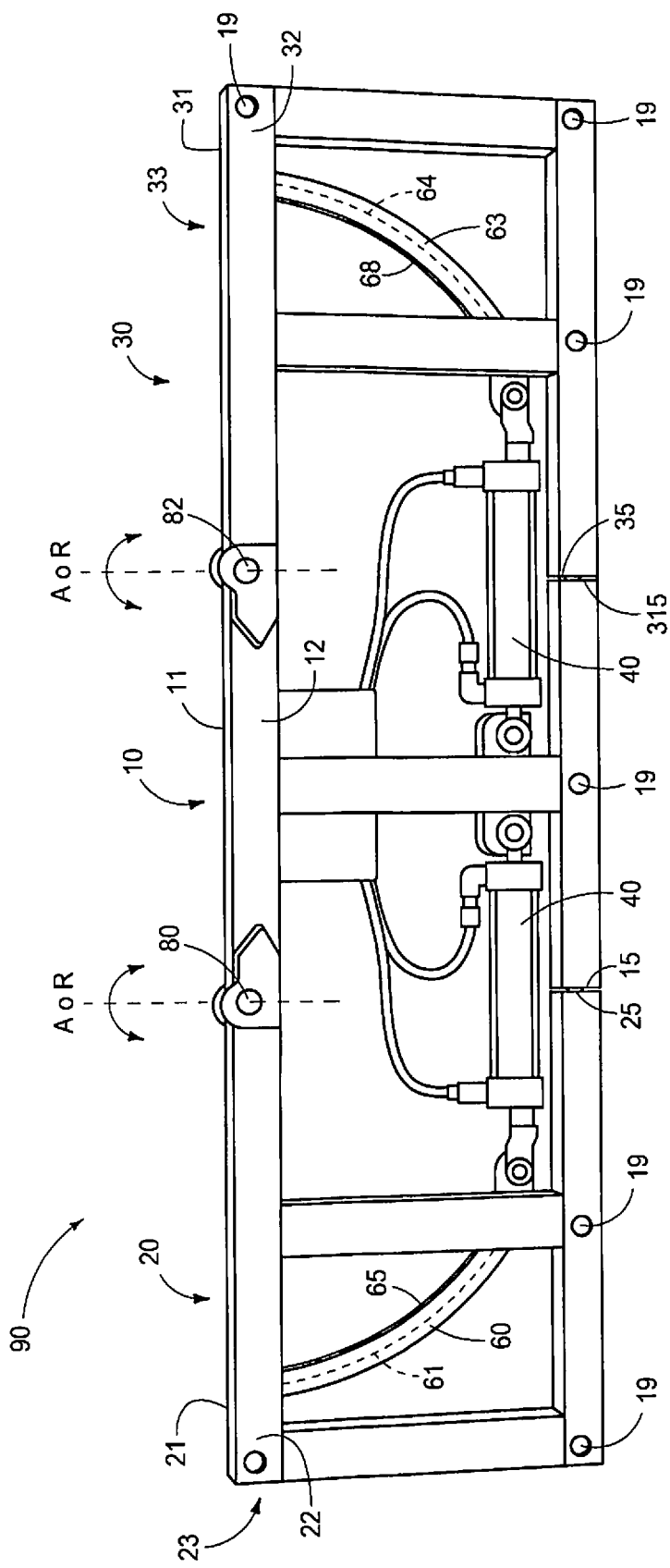
Figure 5:
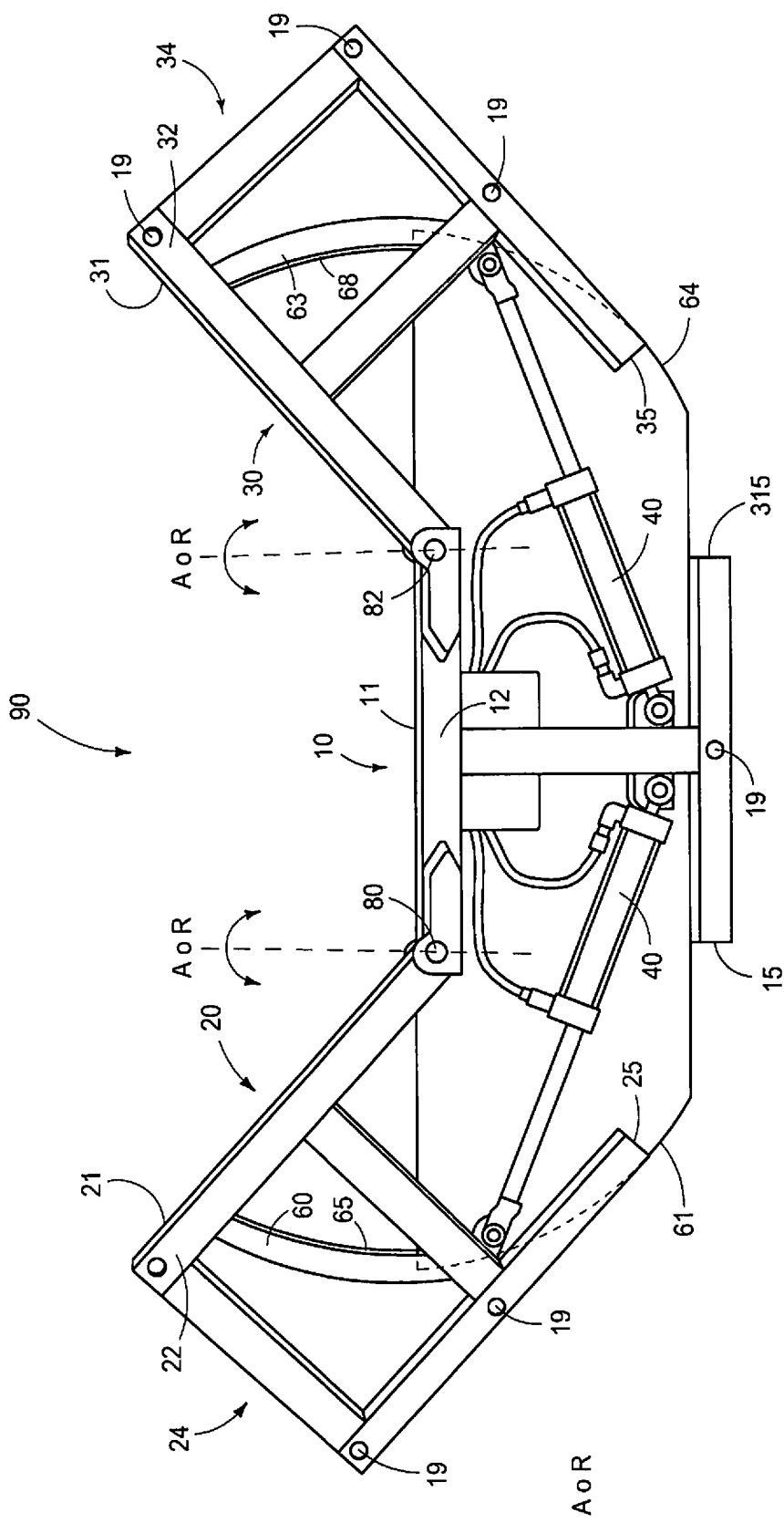

In the example shown in FIGS. 4 and 5, the implement 90 is substantially similar to that which is shown and described with respect to FIGS. 2 and 3, but also includes a third frame member 30. The implement 90 shown in FIGS. 4 and 5 includes a first frame member 10 with a back side 11 and a front side 12. In the example shown in FIGS. 4 and 5, the first frame member 10 is built of metal box beams. As shown in FIGS. 4 and 5, the first frame member 10 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The back side 11 of the first frame member 10 defines a sheet of plate metal extending across each of the two vertical and two horizontal box beams and extending to both sides beyond the vertical support box beams. The first frame member 10 also defines a first pair of sturdy, rigid, circular holes coaxially aligned such that a pin inserted therethrough forms the pin joint 80. The first frame member 10 also defines a second pair of sturdy, rigid, circular holes coaxially aligned such that a pin inserted therethrough forms the pin joint 82.

Still referring to FIGS. 4 and 5, the implement 90 includes a second frame member 20, having a back side 21 and a front side 22. In the example shown in FIGS. 4 and 5, the second frame member 20 is built of metal box beams. As shown in FIGS. 4 and 5, the second frame member 20 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The second frame member 20 defines a pair of sturdy, rigid, circular holes coaxially aligned such that a pin inserted therethrough forms the pin joint 80 and the second frame member 20 is pivotally connected to the first frame member 10 at pin joint 80. A pin or bushing is inserted through the first pair of coaxially aligned joint holes in the first frame member 10 and also through the coaxially aligned joint holes in the second frame member 20 to form the pin joint 80. An axis of rotation ("AoR") intersects the pin joint 80 normal to the back side 11 of the first frame member 10. The second frame member 20 rotates radially about the axis of rotation between a first position 23 at a first elevation (shown in FIG. 4) and a second position 24 at a second elevation (shown in FIG. 5).

Still referring to FIGS. 4 and 5, the implement 90 includes an actuator 40 connected to the first frame member 10 and the second frame member 20. The actuator 40 controls the rotation of the second frame member 20 between the first position 23 and the second position 24. In the example shown in FIGS. 4 and 5, the actuator 40 is a hydraulic cylinder and is operably connected via hydraulic lines to a power source (not shown) and controller (not shown). The implement 90 is configured to move a load, rotating radially, from the first position 23 at the first elevation (shown in FIG. 4) to the second position 24 at the second elevation (shown in FIG. 5). When a first load is engaged at the first frame member 10 and a second load is engaged at the second frame member 20, the first and second loads may be moved separately and independent of one another.

As shown in FIGS. 4 and 5, the second frame member 20 includes an elongated, curved, guide channel 60. The guide channel 60 defines an interior pocket 65 with a U-shaped cross-section. The interior pocket 65 and the curve of the guide channel 60 are sized and shaped to be complementary to an elongated, curved, alignment tab 61 having an arcuate edge. In the example shown in FIGS. 4 and 5, the plate metal at the back side 11 of the first frame member 10 includes an elongated, curved, alignment tab 61 along a first arcuate edge extending to a first side beyond the vertical support box beams. The curved, elongated, arcuate edge of the alignment tab 61 is sized and shaped to be complementary to the interior pocket 65 of the guide channel 60. The curved, elongated, arcuate edge of the alignment tab 61 slidingly engages at least partially within the interior pocket 65 of the guide channel 60. As shown in FIG. 4, when the second frame member 20 is in the first position 23 at the first elevation, the curved, elongated, arcuate edge of the alignment tab 61 of the first frame member 10 slidingly engages within the interior pocket 65 of the guide channel 60 of the second frame member 20. As shown in FIG. 5, when the second frame member 20 is in the second position 24 at the second elevation, the curved, elongated, arcuate edge of the alignment tab 61 is only partially engaged within the interior pocket 65 of the guide channel 60 of the second frame member 20. The guide channel 60 and the alignment tab 61 work together in concert to keep the second frame member 20 and the first frame member 10 aligned, front to back, throughout movement of the second frame member 20 from the first position 23 at the first elevation to the second position 24 at the second elevation, while maintaining free rotational motion about the axis of rotation (AoR). The guide channel 60 and alignment tab 61 relieve some of the angular stresses on the joint 80 while allowing the second frame member 20 to rotate about the axis of rotation (AoR).

In the example shown in FIGS. 4 and 5, the guide channel 60 is located on the second frame member 20 and the alignment tab 61 is located on the first frame member 10. In some embodiments (not shown) they are reversed, with the guide channel 60 located on the first frame member 10 and the complementary alignment tab 61 on the second frame member 20. Either way, the curved, elongated, arcuate edge of the alignment tab 61 slides within the interior pocket 65 of the guide channel 60 as the second frame member 20 rotates between the first position 23 (shown in FIG. 4) and the second position 24 (shown in FIG. 5).

Still referring to FIGS. 4 and 5, the first frame member 10 includes a mating surface 15 disposed at a first predetermined distance from the joint 80 and the second frame member 20 also includes a mating surface 25 disposed at the same first predetermined distance from the joint 80. The mating surface 15 of the first frame member 10, or first mating surface 15, is sized and shaped to mate with and complementary to the mating surface 25 of the second frame member 20, or second mating surface 25.

Still referring to FIGS. 4 and 5, the implement 90 includes a third frame member 30, having a back side 31 and a front side 32. In the example shown in FIGS. 4 and 5, the third frame member 30 is built of metal box beams. As shown in FIGS. 4 and 5, the third frame member 30 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The third frame member 30 includes a pair of sturdy, rigid, circular holes coaxially aligned such that a pin inserted therethrough forms the pin joint 82 and the third frame member 30 is pivotally connected to the first frame member 10 at joint 82. A pin or bushing is inserted through the second pair of coaxially aligned joint holes in the first frame member 10 and also through the coaxially aligned joint holes in the third frame member 30 to form the joint 82. An axis of rotation ("AoR") intersects the joint 82 normal to the back side 11 of the first frame member 10. The third frame member 30 rotates radially about the axis of rotation between a third position 33 at a third elevation (shown in FIG. 4) and a fourth position 34 at a fourth elevation (shown in FIG. 5).

Still referring to FIGS. 4 and 5, the implement 90 includes an actuator 40 connected to the first frame member 10 and the third frame member 30. The actuator 40 controls the rotation of the third frame member 30 between the third position 33 and the fourth position 34. In the example shown in FIGS. 4 and 5, the actuator 40 is a hydraulic cylinder and is operably connected via hydraulic lines to a power source (not shown) and a controller (not shown). The implement 90 is configured to move a load, rotating radially, from the third position 33 at the third elevation (shown in FIG. 4) to the fourth position 34 at the fourth elevation (shown in FIG. 5). When a first load is engaged at the first frame member 10 and a third load is engaged at the third frame member 30, the first and third loads may be moved separately and independent of one another.

As shown in FIGS. 4 and 5, the third frame member 30 includes an elongated, curved, guide channel 63. The guide channel 63 defines an interior pocket 68 with a U-shaped cross-section. The interior pocket 68 and the curve of the guide channel 63 are sized and shaped to be complementary to an elongated, curved, alignment tab 64 having an arcuate edge. In the example shown in FIGS. 4 and 5, the plate metal at the back side 11 of the first frame member 10 defines an elongated, curved, alignment tab 64 along a second arcuate edge extending to the side opposite the alignment tab 61, beyond the vertical support box beams. The curved, elongated, arcuate edge of the alignment tab 64 is sized and shaped to be complementary to the interior pocket 68 of the guide channel 63. The curved, elongated, arcuate edge of the alignment tab 64 slidingly engages at least partially within the interior pocket 68 of the guide channel 63. As shown in FIG. 4, when the third frame member 30 is in the third position 33 at the third elevation, the curved, elongated, arcuate edge of the alignment tab 64 of the first frame member 10 slidingly engages entirely within the interior pocket 68 of the guide channel 63 of the second frame member. As shown in FIG. 5, when the third frame member 30 is in the fourth position 34 at the fourth elevation, the curved, elongated, arcuate edge of the alignment tab 64 is only partially within the interior pocket 68 of the guide channel 63 of the third frame member 30. The guide channel 63 and the alignment tab 64 work together in concert to keep the third frame member 30 and the first frame member 10 aligned, front to back, throughout movement of the third frame member 30 from the third position 33 at the third elevation to the fourth position 34 at the fourth elevation, while maintaining free rotational motion about the axis of rotation (AoR). The guide channel 63 and alignment tab 64 relieve some of the angular stresses on the joint 82 while allowing the third frame member 30 to rotate about the axis of rotation (AoR).

In the example shown in FIGS. 4 and 5, the guide channel 63 is located on the third frame member 30 and the alignment tab 64 is located on the first frame member 10. In some embodiments (not shown) they are reversed, with the guide channel 63 located on the first frame member 10 and the complementary alignment tab 64 on the third frame member 30. Either way, the curved, elongated, arcuate edge of the alignment tab 64 slides within the interior pocket 68 of the guide channel 63 as the third frame member 30 rotates between the third position 33 (shown in FIG. 4) and the fourth position 34 (shown in FIG. 5).

Still referring to FIGS. 4 and 5, the first frame member 10 includes an auxiliary mating surface 315 disposed at a second predetermined distance from the second joint 82 and the third frame member 30 also includes an auxiliary mating surface 35 disposed at the same second predetermined distance from the second joint 82. The auxiliary mating surface 315 of the first frame member 10, or first auxiliary mating surface 315, is sized and shaped to mate with the auxiliary mating surface 35 of the third frame member 30, or third auxiliary mating surface 35.

In the example shown in FIGS. 4 and 5, the implement 90 includes a tubular-shaped mounting socket 19 extending from the back side 11 of the first frame member 10, through the first frame member 10, to the front side 12 of the first frame member. In the example shown in FIGS. 4 and 5, the implement 90 also includes a tubular-shaped mounting socket 19 extending from the back side 21 of the second frame member 20, through the second frame member 20, to the front side 22 of the second frame member 20. In the example shown in FIGS. 4 and 5, the implement 90 also includes a tubular-shaped mounting socket 19 extending from the back side 31 of the third frame member 30, through the third frame member 30, to the front side 32 of the third frame member 30.

Figure 6:
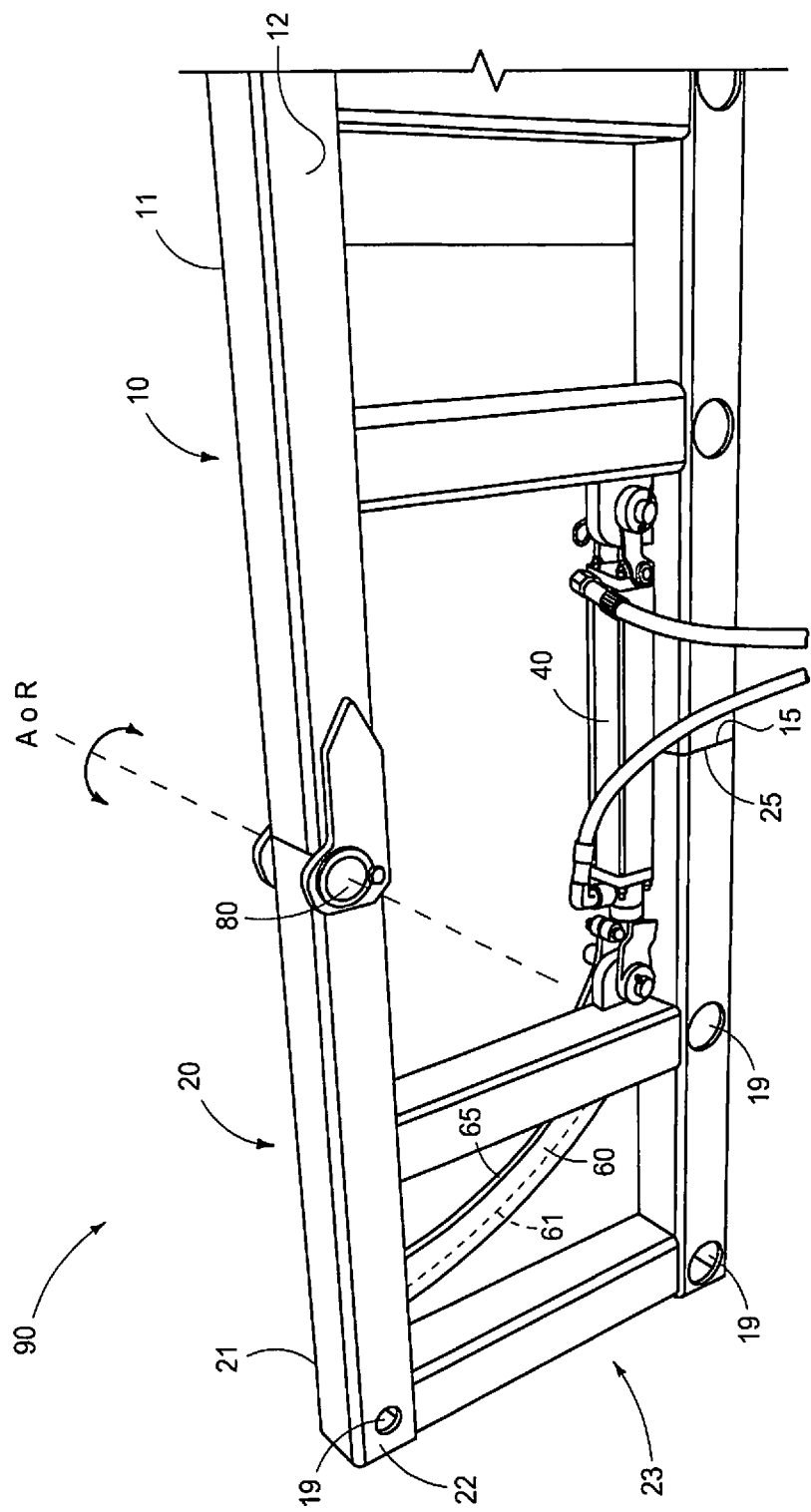
Figure 7:
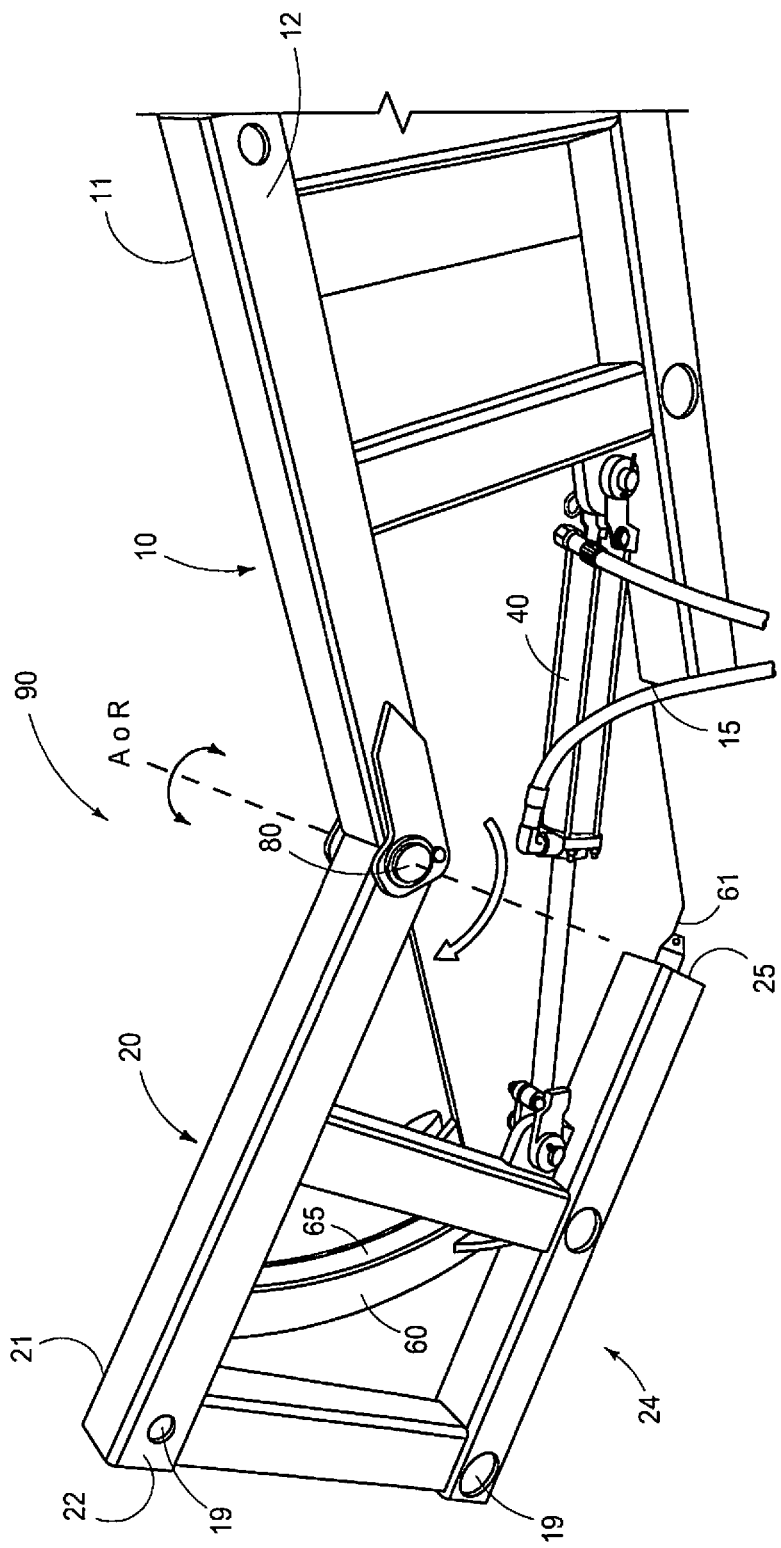

FIG. 6 shows an implement 90 with the second frame member 20 at a first position 23 at a first elevation. FIG. 7 shows an implement 90 with the second frame member 20 at the second position 24 at a second elevation. In the example shown in FIGS. 6 and 7, the implement 90 is built in a manner similar to that which is described above and shown in FIGS. 2 and 3.

Figure 8:
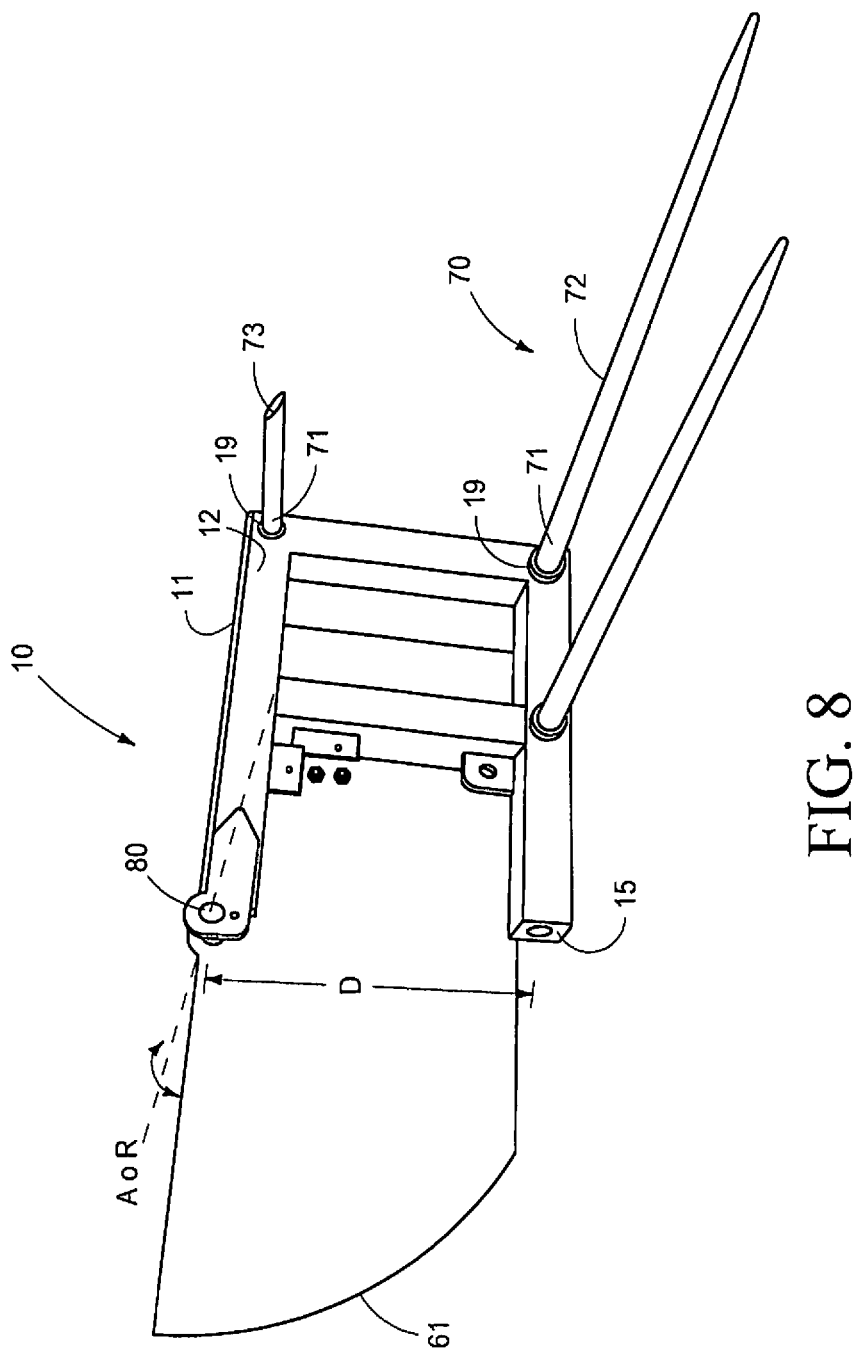
FIG. 8 is a perspective view of a first frame member of an implement, also showing one example of load carriers where the load carriers are bale spikes and a stabilizing spike.

FIG. 8 shows an example of the first frame member 10 of an implement 90. The first frame member 10 includes a back side 11 and a front side 12. In the example shown in FIG. 8, the first frame member 10 is built of metal box beams. The first frame member 10 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The back side 11 of the first frame member 10 defines a sheet of plate metal extending across each of the two vertical and two horizontal box beams and extending to one side beyond the vertical support box beams. The first frame member 10 also defines a pair of sturdy, rigid, circular holes coaxially aligned such that a pin inserted therethrough forms the pin joint 80. The pair of sturdy, rigid, circular, coaxially aligned holes are configured to connect to the second frame member 20 at pin joint 80. The plate metal at the back side 11 of the first frame member 10 defines an elongated, curved, alignment tab 61 along one arcuate edge extending to one side beyond the vertical support box beams. The curved, elongated, arcuate edge of the alignment tab 61 is sized and shaped to be complementary to and slide within an interior pocket 65 of a guide channel 60 of a second frame member 20. In the example shown in FIG. 8, the first frame member 10 also includes an attachment point for the actuator 40. As shown in FIG. 8, the first frame member 10 includes a first mating surface 15 disposed at a predetermined distance (D) from the joint 80. The example shown in FIG. 8 also includes one or more tubular mounting socket 19 sized and shaped to receive the back portion 71 of one or more load carrier 70 to mount the load carrier 70 to the front side 12 of the first frame member 10. In the example shown in FIG. 8, the load carriers 70 include a bale spike 72 and a stabilizing spike 73.

Figure 10:
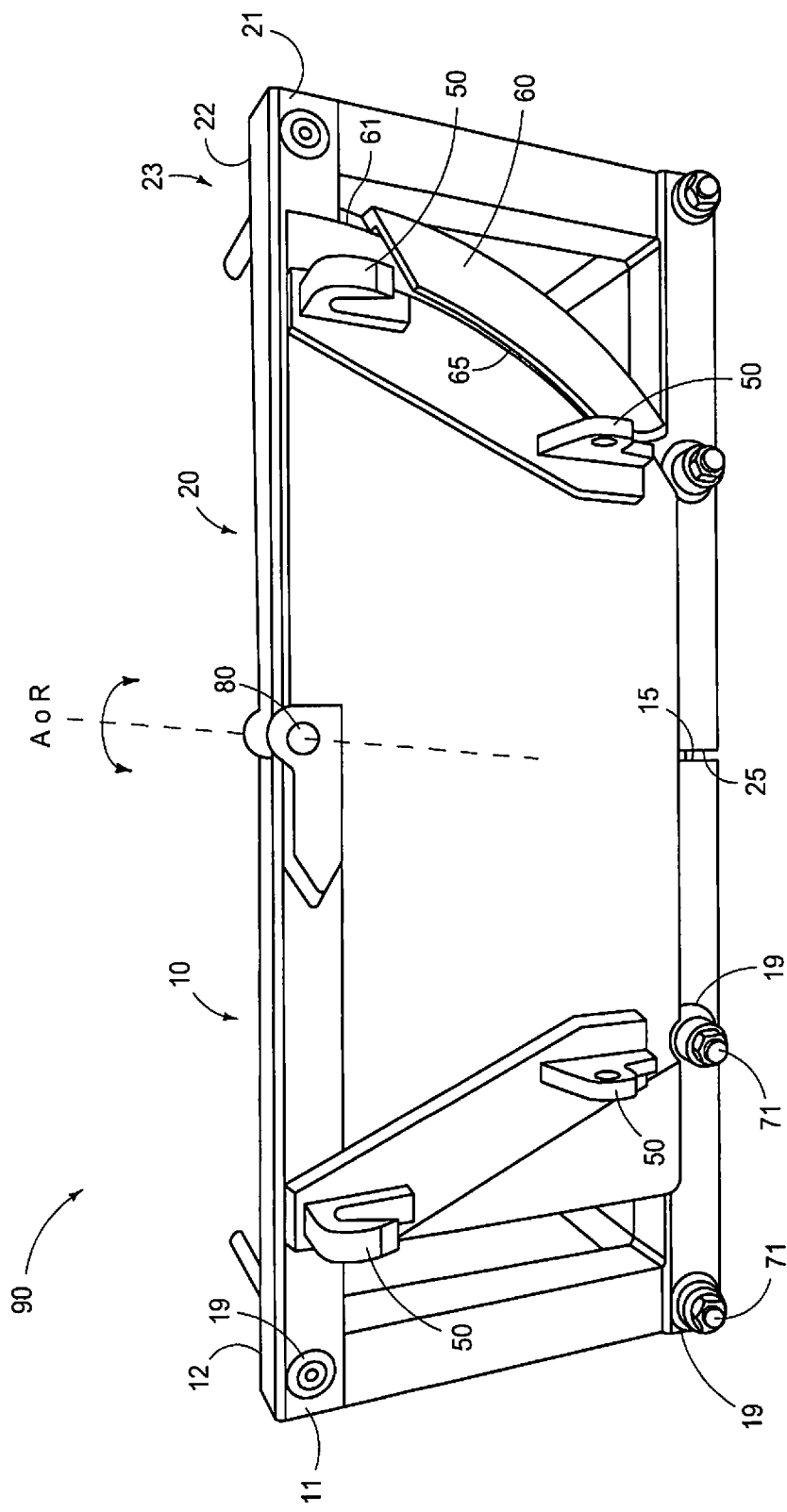
FIG. 10 shows the back side of an implement, with an attachment feature and a second frame member at a first position at a first elevation.

In some embodiments, the implement 90 includes a load carrier 70 mounted to one or more of the first frame member 10, the second frame member 20, and/or the third frame member 30. As shown in FIGS. 1, 8, and 10, in some examples, the implement 90 includes one or more tubular mounting sockets 19 sized and shaped to receive the back portion 71 of one or more load carrier 70 to mount the load carrier 70 to the front side 12, 22, 32 of the first frame member 10, the second frame member 20, and/or the third frame member 30, respectively. In the examples shown in FIGS. 1, 8, and 10, the load carrier 70 is a bale spike 72 and/or a stabilizing spike 73. In other examples (not shown), the load carrier 70 may be, but is not limited to, a bucket, a plow blade, and/or a fence post puller. Additional examples of load carriers 70 are readily apparent to persons having ordinary skill in the art.

Figure 9:
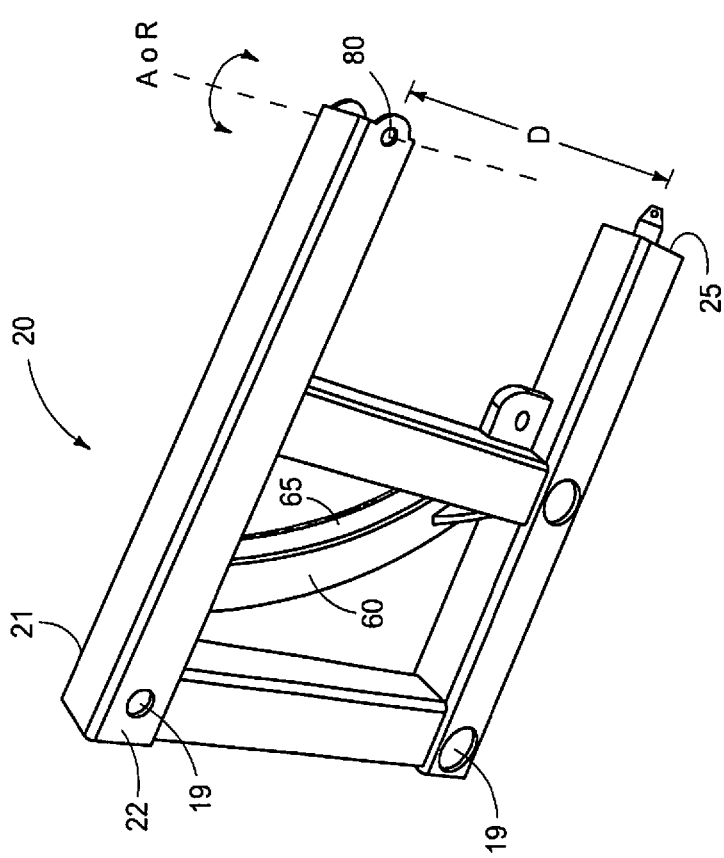

FIG. 9 shows an example of the second frame member 20 of an implement 90. The second frame member 20 includes a back side 21 and a front side 22. In the example shown in FIG. 9, the second frame member 20 is built of metal box beams. As shown in FIG. 9, the second frame member 20 defines a top horizontal box beam and a bottom horizontal box beam with two vertical support box beams, each vertical support box beam connecting the top and bottom horizontal box beams to one another. The two vertical support box beams and the two horizontal box beams are welded together at approximately 90 degree angles to form a rectangular frame. The second frame member 20 defines a pair of sturdy, rigid, circular holes coaxially aligned such that a pin inserted therethrough forms the pin joint 80 and configured such that the second frame member 20 can be pivotally connected to the first frame member 10 at joint 80 when a pin or bushing is inserted through the coaxially aligned joint holes in the first frame member 10 and also through the coaxially aligned joint holes in the second frame member 20 to form the joint 80. The second frame member 20 also defines an elongated, curved, guide channel 60. The guide channel 60 defines an interior pocket 65 with a U-shaped cross-section. The interior pocket 65 and the curve of the guide channel 60 are sized and shaped to be complementary to an elongated, curved, alignment tab 61, having an arcuate edge, of the first frame member 10. In the example shown in FIG. 9, the second frame member 20 also includes an attachment point for the actuator 40. As shown in FIG. 9, the second frame member 20 includes a second mating surface 25 disposed at a predetermined distance (D) from the joint 80. The predetermined distance (D) of the second mating surface 25 from the joint 80 is the same as the predetermined distance (D) of the first mating surface 15 from the joint 80 (shown in FIG. 8) such that the first mating surface 15 mates with and is complementary to the second mating surface 25. The example shown in FIG. 9 also includes one or more tubular mounting socket 19 sized and shaped to receive the back portion 71 of one or more load carrier 70 to mount the load carrier 70 to the front side 22 of the second frame member 20.

Figure 11:
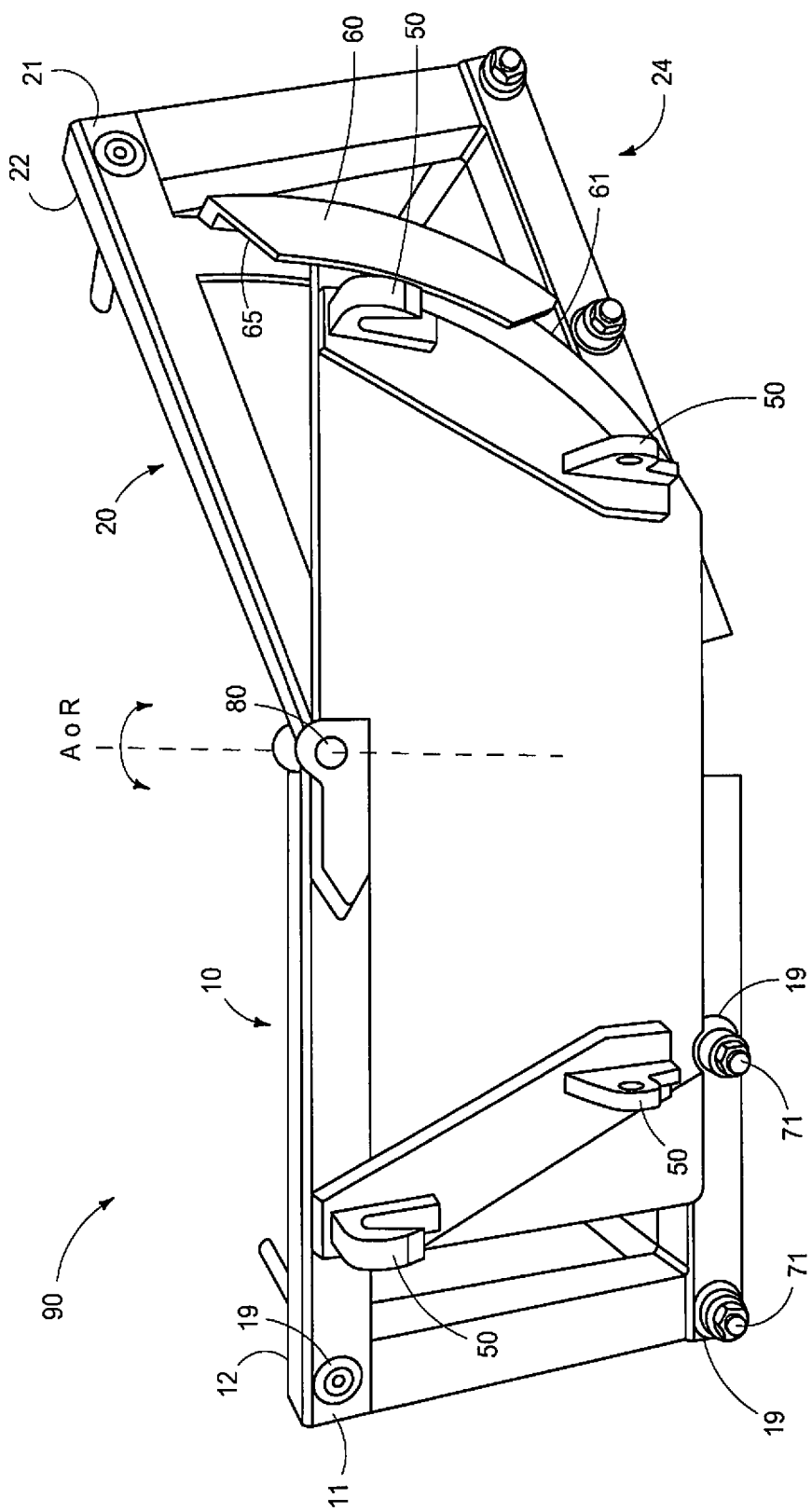
FIG. 11 shows the back side of an implement, similar to that which is shown in FIG. 10, with an attachment feature and a second frame member partially pivoted toward a second position at a second elevation.

FIGS. 10 and 11 show the back side of an implement 90. In the example shown in FIGS. 10 and 11, the implement 90 includes a first frame member 10 with a back side 11 and a front side 12 opposite the back side 11. In the example shown in FIGS. 10 and 11, the first frame member 10 is built of metal box beams forming a rectangular framework welded together at approximately 90 degree angles. The back side 11 of the first frame member 10 defines a sheet of plate metal affixed to the rectangular framework and an attachment feature 50 mounted thereon. The first frame member 10 also defines a pair of sturdy, rigid, circular holes coaxially aligned such that a pin inserted therethrough forms the pin joint 80.

Still referring to FIGS. 10 and 11, the implement 90 includes a second frame member 20, having a back side 21 and a front side 22. In the example shown in FIGS. 10 and 11, the second frame member 20 is built of a metal box beam framework welded together at 90 degree angles. The second frame member 20 defines a pair of sturdy, rigid, circular holes coaxially aligned such that a pin inserted therethrough forms the pin joint 80 and the second frame member 20 is pivotally connected to the first frame member 10 at joint 80. A pin or bushing is inserted through the coaxially aligned joint holes in the first frame member 10 and also through the coaxially aligned joint holes in the second frame member 20 to form the joint 80. An axis of rotation ("AoR") intersects the joint 80 normal to the back side 11 of the first frame member 10. The second frame member 20 rotates radially about the axis of rotation between a first position 23 at a first elevation (shown in FIG. 10) and a second position 24 at a second elevation (shown in FIG. 11).

As shown in FIGS. 10 and 11, the second frame member 20 defines an elongated, curved, guide channel 60. The guide channel 60 defines an interior pocket 65 with a U-shaped cross-section. The interior pocket 65 and the curve of the guide channel 60 are sized and shaped to be complementary to an elongated, curved, alignment tab 61 having an arcuate edge. In the example shown in FIGS. 10 and 11, the plate metal at the back side 11 of the first frame member 10 defines an elongated, curved, alignment tab 61 along one arcuate edge extending to one side. The curved, elongated, arcuate edge of the alignment tab 61 is sized and shaped to be complementary to the interior pocket 65 of the guide channel 60. The curved, elongated, arcuate edge of the alignment tab 61 rests at least partially within the interior pocket 65 of the guide channel 60. As shown in FIG. 10, when the second frame member 20 is in the first position 23 at the first elevation, the curved, elongated, arcuate edge of the alignment tab 61 of the first frame member 10 rests securely and entirely within the interior pocket 65 of the guide channel 60 of the second frame member. As shown in FIG. 11, when the second frame member 20 is in the second position 24 at the second elevation, the curved, elongated, arcuate edge of the alignment tab 61 rests securely and partially within the interior pocket 65 of the guide channel 60 of the second frame member 20. The guide channel 60 and the alignment tab 61 work together in concert to keep the second frame member 20 and the first frame member 10 aligned, front to back, throughout movement of the second frame member 20 from the position 23 at the first elevation to the position 24 at the second elevation, while maintaining free rotational motion about the axis of rotation (AoR). The guide channel 60 and alignment tab 61 relieve some of the angular stresses on the joint 80 while allowing the second frame member 20 to rotate about the axis of rotation (AoR).

In the example shown in FIGS. 10 and 11, the implement 90 includes one or more tubular-shaped mounting socket 19 extending from the back side 11 of the first frame member 10 through to the front side 12. In the example shown in FIGS. 10 and 11, the implement 90 also includes one or more tubular-shaped mounting socket 19 extending from the back side 21 of the second frame member 20 through to the front side 22.

The implement 90 includes the attachment feature 50 on the back side 11 of the first frame member 10. The attachment feature 50 secures the implement 90 to a vehicle 99. An example of the attachment feature 50 is shown in FIGS. 10 and 11. Persons of ordinary skill in the art will readily recognize that there are many known ways to attach an implement to a vehicle and that any such known attachment can be used and included on the back side 11 of the first frame member 10.

Figure 12:
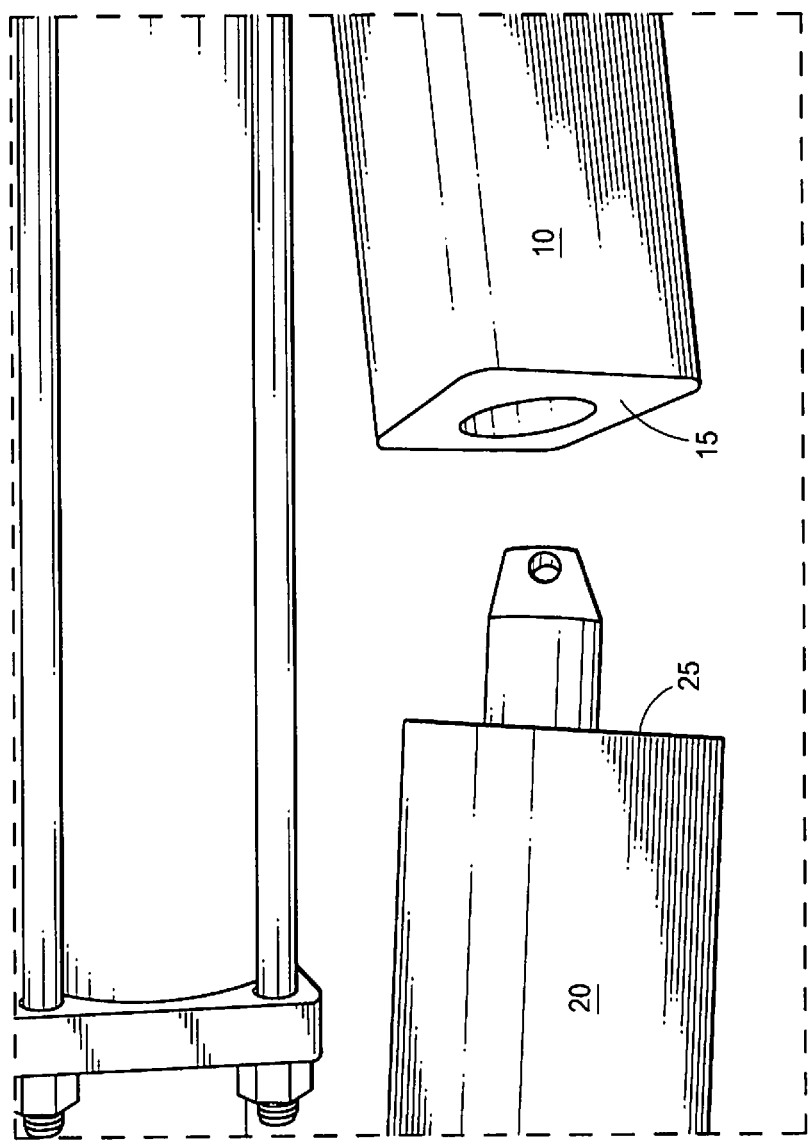
FIG. 12 shows an enlarged view of mating surfaces of a first frame member and a second frame member of an implement.
Figure 13:
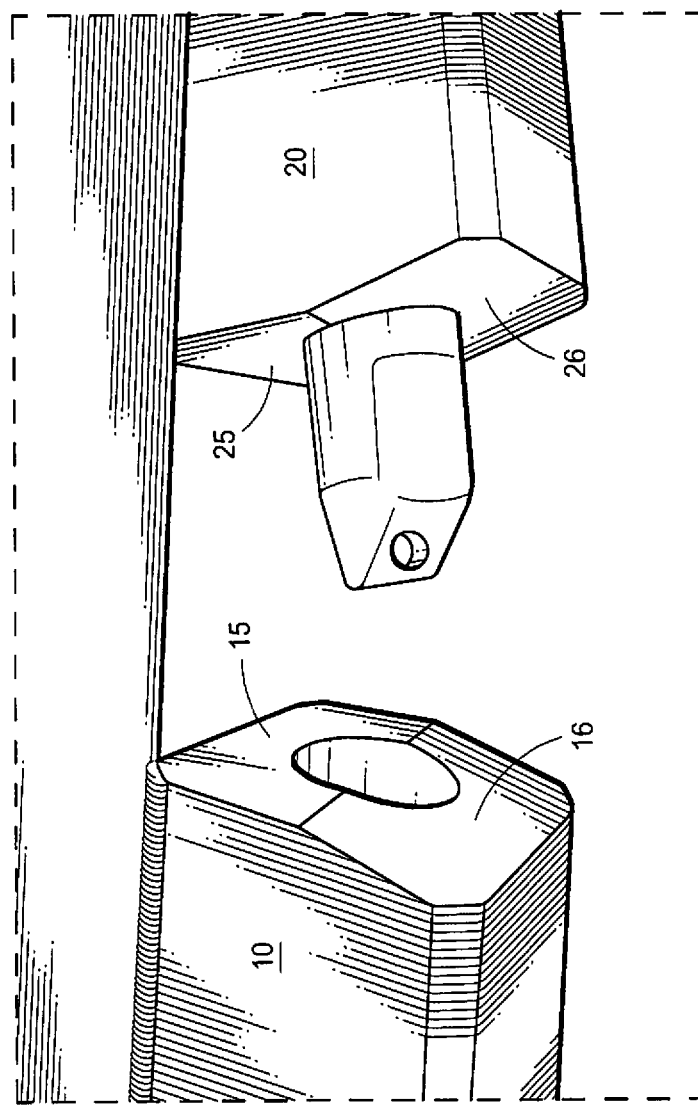
FIG. 13 shows an enlarged view of mating surfaces of a first frame member and a second or third frame member of an implement.
Figure 14:
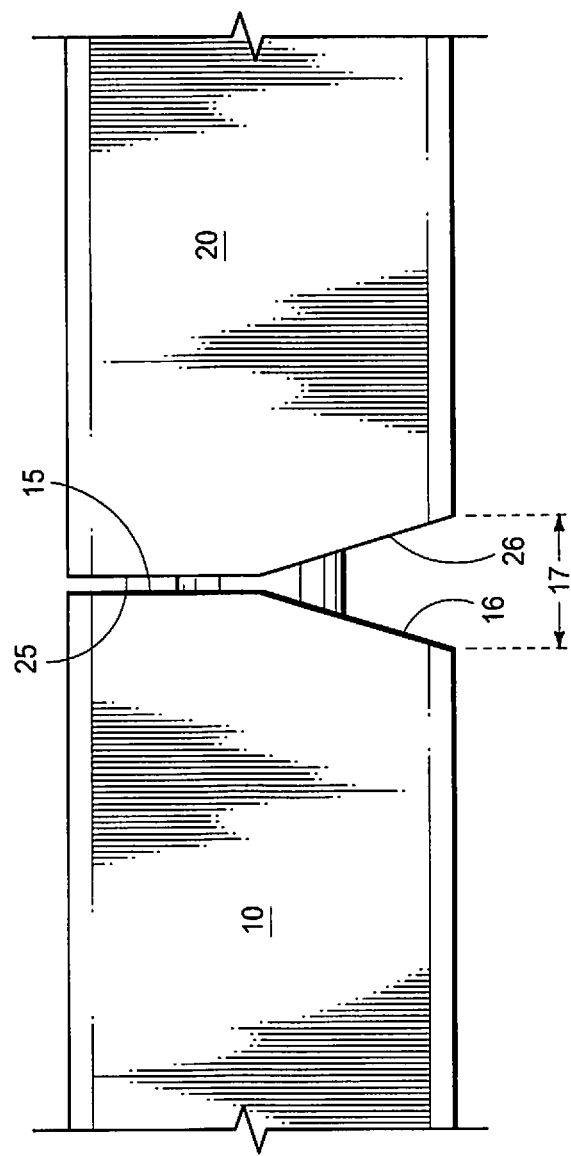
FIG. 14 shows an enlarged view of mating surfaces with a bevel between a first frame member and a second or third frame member of an implement.

In the examples shown throughout the Figures, the first frame member 10 includes a mating surface 15 disposed at a predetermined distance (indicated as D in FIG. 8) from the joint 80 and the second frame member 20 also includes a mating surface 25 disposed at the same predetermined distance (indicated as D in FIG. 9) from the joint 80. The mating surface 15 of the first frame member 10, or first mating surface 15, is sized and shaped to be complementary to and mate with the mating surface 25 of the second frame member 20, or second mating surface 25. FIGS. 12, 13, and 14 show an enlargement of the interaction of the first mating surface 15 and the second mating surface 25.

In an example shown in FIGS. 13 and 14, a portion of one or both of the first mating surface 15 and/or second mating surface 25 includes a bevel 16 or 26, respectively, such that when the first mating surface 15 mates with the second mating surface 25, a void or pocket 17 is created at the bevel 16 and/or 26, between the first mating surface 15 and the second mating surface 25. Embodiments with a third frame 30, such as that which is shown in FIGS. 4 and 5, include first and third auxiliary mating surfaces 315 and 35 as discussed above, which may be sized and shaped to look and function similar to that which has been previously described with respect to mating surfaces 15 and 25.

In FIGS. 1-7, the actuator 40 of the implement 90 is shown as a hydraulic cylinder, connected via hydraulic lines to a power source and controller. In some embodiments, the actuator 40 (as shown in FIGS. 1-7) is a pneumatic cylinder, connected to a power source and a controller. In some embodiments the power source and controller are located on the vehicle 99 (shown in FIG. 1).

Figure 15:
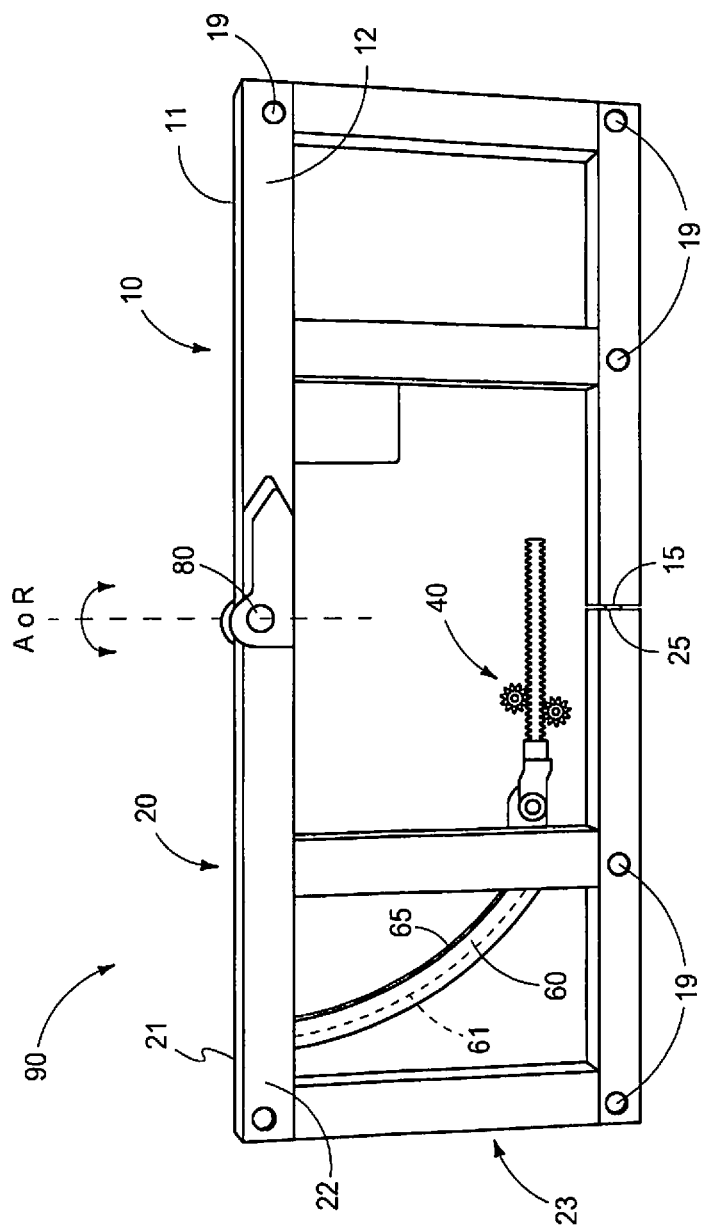
Figure 16:
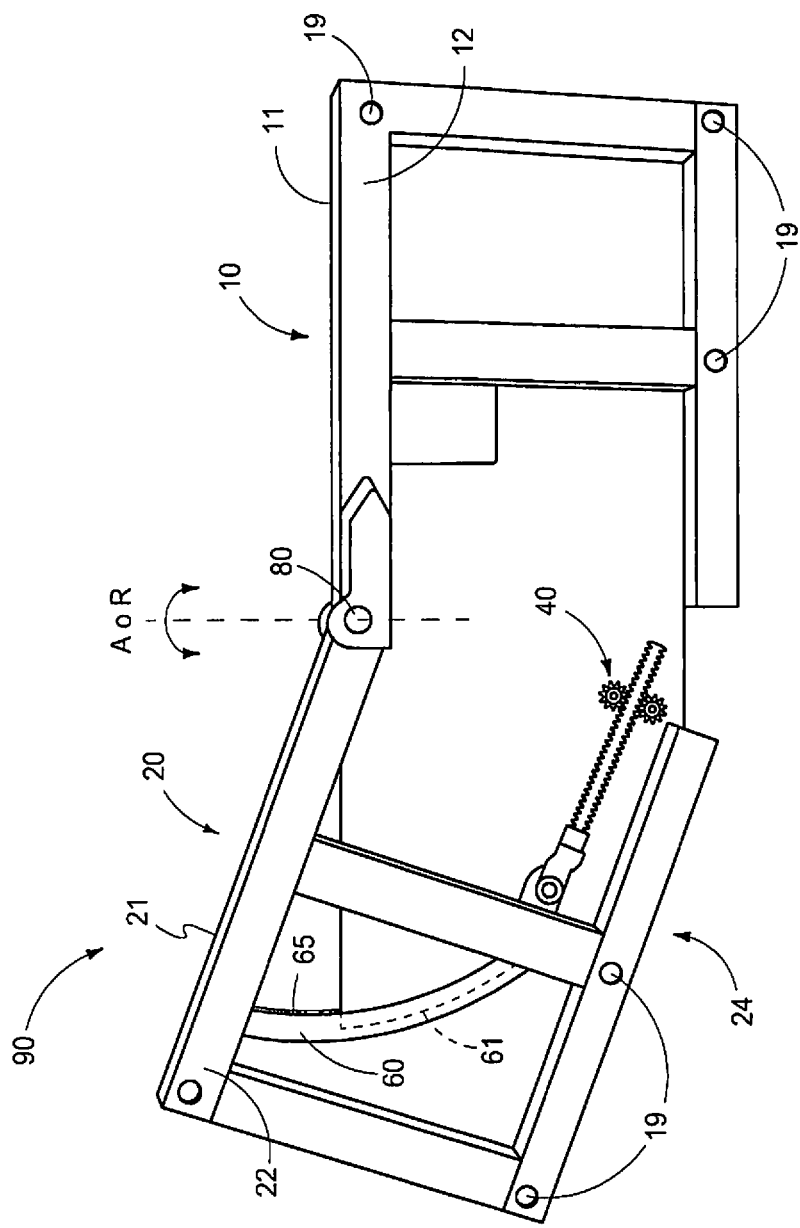

In the example shown in FIGS. 15 and 16, the implement 90 is substantially similar to that which is shown and described in FIGS. 2 and 3 or FIGS. 6 and 7. FIGS. 15 and 16 show an alternative embodiment for the actuator 40. As shown in FIGS. 15 and 16, the actuator 40 defines a geared bar or rod connected to the second frame member 20. A pair of round gears are mounted to the first frame member 10, one each mounted on opposite sides of the geared bar/rod. The geared bar/rod defines teeth sized and shaped to engage and mesh with teeth of the round gears. One of the round gears is operably connected, on the back side 11 of the first frame member 10, to a motor to drive the geared bar/rod and rotate the second frame member 20 about the axis of rotation (AoR) between the position 23 at the first elevation (shown in FIG. 15) and the position 24 at the second elevation (shown in FIG. 16). The motor is operably connected to a power source and a controller. In some embodiments, the motor is electric powered. In some embodiments, the motor is powered by petroleum-based fuel.

Figure 17:
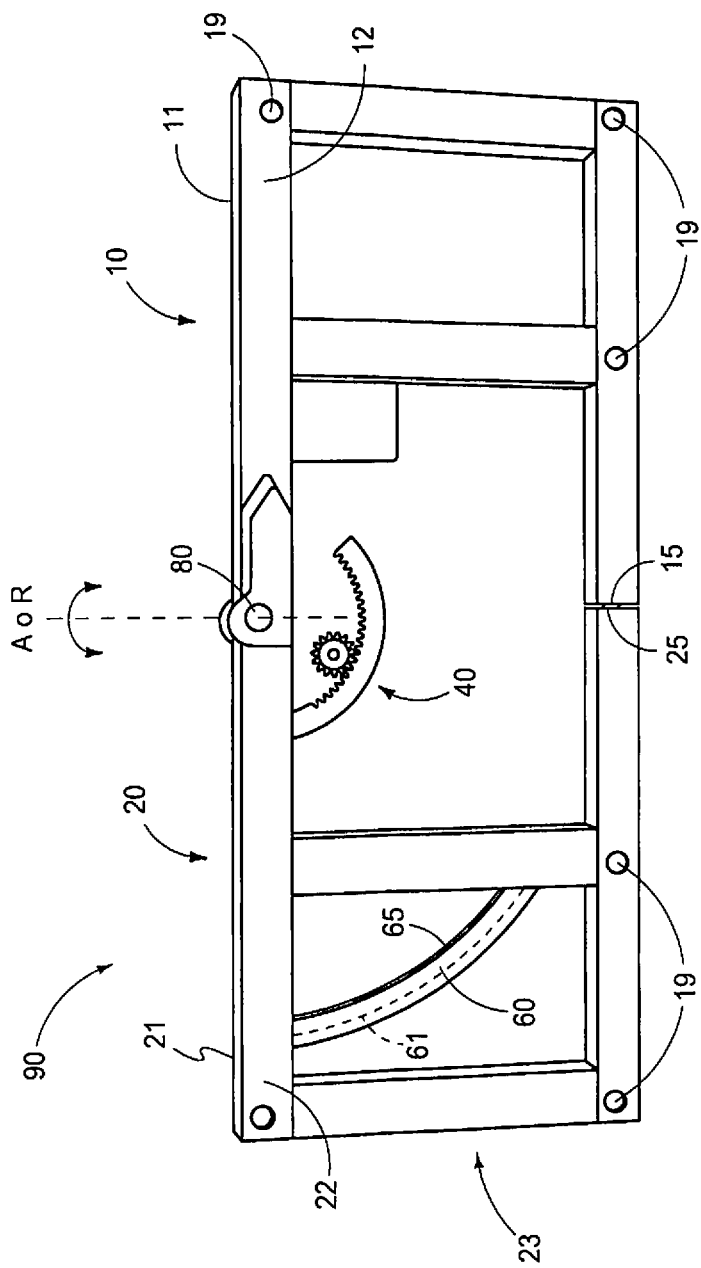
Figure 18:
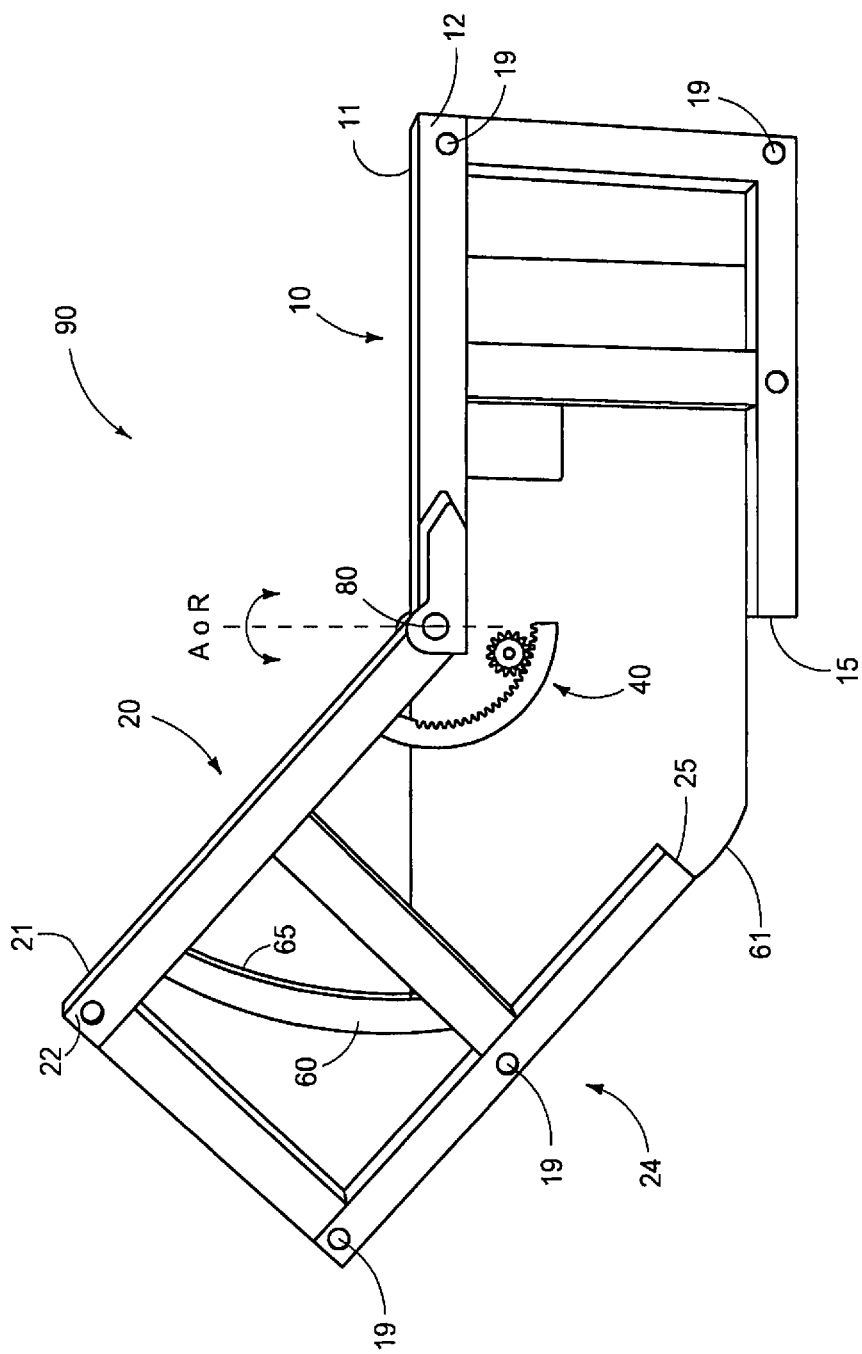

In the example shown in FIGS. 17 and 18, the implement 90 is substantially similar to that which is shown and described in FIGS. 2 and 3 or FIGS. 6 and 7. FIGS. 17 and 18 show another embodiment for the actuator 40. As shown in FIGS. 17 and 18, the actuator 40 defines an arcuate gear connected to the second frame member 20. A round gear is mounted to the first frame member 10. The arcuate gear defines teeth sized and shaped to engage and mesh with teeth of the round gear. The round gear is operably connected, on the back side 11 of the first frame member 10, to a motor to drive the arcuate gear and rotate the second frame member 20 about the axis of rotation (AoR) between the position 23 at the first elevation (shown in FIG. 17) and the position 24 at the second elevation (shown in FIG. 18).

Throughout the figures, a means for actuating 40 radial rotation of the second frame member 20 relative to the first frame member rotates the second frame member 20 about the axis of rotation (AoR) between the position 23 at the first elevation (shown in FIGS. 2, 4, 6, 10, 15, and 17) and the position 24 at the second elevation (shown in FIGS. 3, 5, 7, 11, 16, and 18). In some examples, the means for actuating 40 is a hydraulic cylinder (as shown in FIGS. 1-7), connected via hydraulic lines to a power source and controller. In some embodiments, the means for actuating 40 (substantially identical to that shown in FIGS. 1-7) is a pneumatic cylinder, connected to a power source and a controller. In some examples, the means for actuating 40 is a geared apparatus (as shown in FIGS. 15 and 16 or FIGS. 17 and 18) connected to a power source and a controller. In some examples (not shown), the means for actuating 40 is an electric motor and/or mechanical device. In some examples (not shown), the means for actuating 40 includes gears, wheels, pulleys, and/or other simple machines. Additional examples of means for actuating 40 are readily apparent to persons having ordinary skill in the art.

Operation

References to the words "first," "second," and/or "third" are not intended to be indicating chronological order.

A method of using the vehicle supported implement for handling separate loads independently is presented. The method includes providing an implement 90 as discussed herein. The implement 90 is secured to a vehicle 99. The actuator 40 is operably connected to a power source (not shown) and a controller (not shown). A first load carrier 70 is mounted to the front side 12 of the first frame member 10 and a second load carrier 70 is mounted to the front side 22 of the second frame member 20. The implement 90 is positioned such that the first and second load carriers 70 are horizontal and elevated relative to a surface below the load carriers 70 such that forward and backward motion of the implement 90 is not impeded by the surface below the implement 90. The second frame member 20 is rotated to the first position 23 at the first elevation. The implement 90 is moved toward a second load and the second load is engaged with second load carrier 70. The second frame member 20, with the second load engaged, is rotated radially about an axis of rotation to the second position 24 at the second elevation. The implement 90 is moved toward a first load and the first load is engaged with the first load carrier 70. The implement 90 is raised vertically. In some embodiments, the second frame member 20, with the second load engaged, is rotated back to the first position 23 at the first elevation.

In some embodiments, the method of using the implement 90 includes lowering the implement 90. The first load is disengaged from the first load carrier 70 as the implement 90 is moved away from the first load. The second frame member 20, with the second load engaged, is rotated to the first position 23 at the first elevation. The second load is disengaged from the second load carrier 70 as the implement 90 is moved away from the second load.

Example 1

By way of example, a method of using the implement 90 is presented wherein the load moved by the implement 90 is a hay bale. In this example, the implement 90 is used to engage, lift, and move two loads (two hay bales) without reversing the motion of the vehicle. Before engaging the loads, the two hay bales need not be side-by-side. The implement 90 is used to engage and move each of the two hay bales independent of one another. The two hay bales may be disengaged one-by-one or simultaneously.

The implement 90 provided includes two frame members and the back side of the implement 90 is secured to a vehicle 99 via an attachment feature 50. Bale spikes 72 and stabilizing spikes 73 are load carriers 70 mounted to the first and second frame members 10 and 20. The back portion 71 of a bale spike 72 is mounted in one of the mounting sockets 19 of the front side 12 of the first frame member 10. The back portion 71 of a stabilizing spike 73 is mounted in another one of the mounting sockets 19 of the front side 12 of the first frame member 10. The back portion 71 of another bale spike 72 is mounted in one of the mounting sockets 19 of the front side 22 of the second frame member 20. The back portion 71 of another stabilizing spike 73 is mounted in another one of the mounting sockets 19 of the front side 22 of the second frame member 20. The implement 90 is positioned such that the bale spikes 72 of the first and second frame members 10 and 20 are horizontal and elevated relative to the ground below the bale spikes 72 such that forward and backward motion of the implement 90 is not impeded by the ground. If it is not already, the second frame member 20 is rotated to the first position 23 at the first elevation. The implement 90 is moved toward a hay bale. The hay bale is engaged with the bale spike 72 and stabilizing spike 73 mounted on the second frame member 20. This hay bale is referred to as the second hay bale as it is engaged with the bale spike 72 of the second frame member 20. The second frame member 20, with the second hay bale engaged, is rotated to the second position 24 at the second elevation. The implement 90 is moved toward another hay bale. The other hay bale is engaged with the bale spike 72 and stabilizing spike 73 mounted on the front side 12 of the first frame member 10. This other hay bale is referred to as the first hay bale as it is engaged with the bale spike 72 of the first frame member 10. The implement 90 is raised vertically, lifting the first and second hay bales vertically.

In some situations, the two hay bales are disengaged simultaneously. In this case, the second frame member 20, with the second hay bale engaged, is rotated back to the first position 23 at the first elevation. The implement 90 is lowered vertically until the hay bales are resting on a surface below them, such as the ground, a flat bed trailer, or other hay bales if the hay bales are being stacked. The implement 90 is moved away from the first and second hay bales and the hay bales are disengaged from the respective first and second bale spikes 72.

In some other situations, the two hay bales are disengaged independently, one-by-one. In this case, the second frame member 20, with the second hay bale engaged, remains in the second position 24 at the second elevation until after the first hay bale is disengaged. The implement 90 is lowered vertically until the first hay bale is resting on the surface below. The implement 90 is moved away from the first hay bale and the first hay bale is disengaged from the first bale spike 72. The implement 90, with the second frame member 20 in the second position 24 at the second elevation with the second hay bale still engaged, is moved to the desired location for the second hay bale. The second frame member 20 is rotated to the first position 23 at the first elevation. If necessary, the implement 90 is raised or lowered vertically until the second hay bale is resting on the surface below. The implement 90 is moved away from the second hay bale and the second hay bale is disengaged from the second bale spike 72.

Example 2

By way of example, a method of using the implement 90 is presented wherein the load moved by the implement 90 is a hay bale. In this example, the implement 90 is used to engage, lift, and move three loads (three hay bales) without reversing the motion of the vehicle. Before engaging the loads, the three hay bales need not be side-by-side. The implement is used to engage each of the three hay bales independent of one another. The three hay bales may be disengaged one-by-one or simultaneously.

The implement 90 provided includes three frame members 10, 20, and 30. The back side 11 of the first frame member 10 of the implement 90 is secured to a vehicle 99 via an attachment feature 50. Bale spikes 72 and stabilizing spikes 73 are load carriers 70 mounted to the first, second, and third frame members 10, 20, and 30. The back portion 71 of a bale spike 72 is mounted in one of the mounting sockets 19 of the front side 12 of the first frame member 10. The back portion 71 of a stabilizing spike 73 is mounted in another one of the mounting sockets 19 of the front side 12 of the first frame member 10. The back portion 71 of another bale spike 72 is mounted in one of the mounting sockets 19 of the front side 22 of the second frame member 20. The back portion 71 of another stabilizing spike 73 is mounted in another one of the mounting sockets 19 of the front side 22 of the second frame member 20. The back portion 71 of a bale spike 72 is mounted in one of the mounting sockets 19 of the front side 32 of the third frame member 30. The back portion 71 of a stabilizing spike 73 is mounted in another one of the mounting sockets 19 of the front side 32 of the third frame member 30.

The implement 90 is positioned such that the bale spikes 72 of the first, second, and third frame members 10, 20, and 30 are horizontal. If they are not already, the second frame member 20 is rotated to the first position 23 at the first elevation and the third frame member 30 is rotated to the third position 33 at the third elevation. The implement 90 is moved forward toward a hay bale. The hay bale is engaged with the bale spike 72 and stabilizing spike 73 mounted on the third frame member 30. This hay bale is referred to as the third hay bale as it is engaged with the bale spike 72 of the third frame member 30. The third frame member 30, with the third hay bale engaged, is rotated to the fourth position 34 at the fourth elevation. The implement 90 is moved forward toward another hay bale. This another hay bale is engaged with the bale spike 72 and stabilizing spike 73 mounted on the second frame member 20. This another hay bale is referred to as the second hay bale as it is engaged with the bale spike 72 of the second frame member 20. The second frame member 20, with the second hay bale engaged, is rotated to the second position 24 at the second elevation. The implement 90 is moved forward toward another hay bale. This hay bale is engaged with the bale spike 72 and stabilizing spike 73 mounted on the front side 12 of the first frame member 10. This hay bale is referred to as the first hay bale as it is engaged with the bale spike 72 of the first frame member 10. The implement 90 is raised vertically, lifting the first, second, and third hay bales vertically.

In some situations, the three hay bales are disengaged simultaneously. In this case, the second frame member 20, with the second hay bale engaged, is rotated back to the first position 23 at the first elevation and the third frame member 30, with the third hay bale engaged, is rotated back to the third position 33 at the third elevation. The implement 90 is lowered vertically until the hay bales are resting on a surface below them, such as the ground, a flatbed trailer, or other hay bales if the hay bales are being stacked. The implement 90 is moved backward away from the first, second, and third hay bales and the hay bales are disengaged from the respective first, second, and third bale spikes 72.

In some other situations, the three hay bales are disengaged independently, one-by-one. In this case, the second frame member 20, with the second hay bale engaged, remains in the second position 24 at the second elevation and the third frame member 30, with the third hay bale engaged, remains in the fourth position 34 at the fourth elevation until after the first hay bale is disengaged. The implement 90 is lowered until the first hay bale is resting on the surface below. The implement 90 is moved backward away from the first hay bale and the first hay bale is disengaged from the first bale spike 72. The implement 90, with the second frame member 20 in the second position 24 at the second elevation with the second hay bale still engaged, is moved to the desired location for the second hay bale. The third frame member 30, with the third hay bale engaged, remains in the fourth position 34 at the fourth elevation until after the second hay bale is disengaged. The second frame member 20 is rotated to the first position 23 at the first elevation. If necessary, the implement 90 is raised or lowered vertically until the second hay bale is resting on the surface below. The implement 90 is moved backward away from the second hay bale and the second hay bale is disengaged from the second bale spike 72. The implement 90 is moved to the desired location for the third hay bale. The third frame member 30 is rotated to the third position 33 at the third elevation. If necessary, the implement 90 is raised or lowered until the third hay bale is resting on the surface below. The implement 90 is moved backward away from the third hay bale and the third hay bale is disengaged from the third bale spike 72. These procedures may be adjusted as necessary to engage or disengage all three hay bales, two at a time, or one-by-one.

Example 3

By way of example, a method of using the implement 90 is presented wherein the load moved by the implement 90 is snow. In this example, the implement 90 is used to engage and move two loads of snow. The implement 90 is used to engage each of the two loads of snow independent of one another.

As discussed above, the implement provided includes two frame members 10 and 20 and the back side 11 of the first frame member 10 of the implement 90 is secured to a vehicle 99 via an attachment feature 50. Snow plow blades are load carriers 70 mounted to the first and second frame members 10 and 20. A first snow plow blade (load carrier 70) is mounted to the front side 12 of the first frame member 10. A second snow plow blade (load carrier 70) is mounted to the front side 22 of the second frame member 20. The implement 90 is positioned such that the snow plow blades of the first and second frame members 10 and 20 are horizontal. The implement 90 is lowered and moved toward a load of snow. The load of snow is engaged with either or both the first and/or second snow plow blade mounted on the first and/or second frame member 10 and/or 20. When an obstacle is approached, the second frame member 20, with a load of snow engaged, is rotated to the second position 24 at the second elevation, thus disengaging the second load of snow without disengaging the first load of snow. The implement 90 is moved forward until the obstacle is passed. As the implement 90 is moved forward, it is raised and lowered vertically as necessary to engage and disengage loads of snow and the second frame member 20 is rotated between the first position 23 at the first elevation and the second position 24 at the second elevation, to engage and disengage a snow load independent of the first frame member 10.

Example 4

By way of example, a method of using the implement 90 is presented wherein the load moved by the implement 90 is soil, gravel, water, or similar and the load carriers 70 are buckets. As discussed above, the implement provided includes two frame members 10 and 20 and the back side 11 of the first frame member 10 of the implement 90 is secured to a vehicle 99 via an attachment feature 50. Buckets are load carriers 70 mounted to the first and second frame members 10 and 20. A first bucket is mounted to the front side 12 of the first frame member 10. A second bucket is mounted to the front side 22 of the second frame member 20. The implement 90 is positioned such that the buckets of the first and second frame members 10 and 20 are horizontal. The implement 90 is lowered and moved toward a load of soil, gravel, water, or similar. The load is engaged with either or both the first and/or second bucket mounted on the first and/or second frame member 10 and 20. As the implement 90 is moved forward, it is raised and lowered vertically as necessary to engage, disengage, and move loads and the second frame member 20 is rotated between the first position 23 at the first elevation and the second position 24 at the second elevation, to engage, disengage, and move a load independent of the first frame member 10.

Example 5

By way of example, a method of using the implement 90 is presented wherein the load moved by the implement 90 is a fence post or similar and the load carrier 70 is a fence post puller. As discussed above, the implement 90 provided includes two frame members 10 and 20 and the back side 11 of the first frame member 10 of the implement 90 is secured to a vehicle 99 via an attachment feature 50. A fence post puller is the load carrier 70 mounted to the second frame member 20. The implement 90 is moved such that the fence post puller is positioned next to the fence post to be removed. The fence post is engaged with, or secured to, the fence post puller mounted to the second frame member. The second frame member is rotated between the first position 23 at the first elevation and the second position 24 at the second elevation, thus pulling the fence post up and at least partially out of the ground.

In other embodiments, the first and second frame members 10 and 20 are used as pincers to grasp loads between the load carriers 70 mounted on the first and second frame members 10 and 20, respectively.

In this specification, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration is by way of example, and the scope of the claims are not limited to the exact details shown or described.

Although the description of the implement has been described by reference to one or more example embodiment, and the best mode contemplated has been shown and described, it will be understood that certain changes, modification or variations may be made, and in the construction thereof, other than those specifically set forth herein, may be achieved by those skilled in the art without departing from the spirit and scope of the invention, and that such changes, modification or variations are to be considered as being within the overall scope of the implement. Therefore, it is contemplated to cover the implement and any and all changes, modifications, variations, or equivalents that fall within the true spirit and scope of the underlying principles disclosed and claimed herein. Consequently, the scope of the implement is intended to be limited only by the attached claims, all matter contained in the above description and shown in the accompanying drawings shall be interpreted as illustrative and not in a limiting sense.

It is also to be understood that the following claims are intended to cover the generic and specific features herein described, and all statements of the scope of the invention which, as a matter of language, might be said to fall therebetween.

Finally, it will be appreciated that the purpose of the Abstract is to enable the patent offices and the public generally, and especially the scientists and engineers in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A vehicle supported implement for handling separate loads independently, the implement comprising:
    a first frame member having a back side and a front side opposite the back side;
    a second frame member having a back side and a front side opposite the back side, the second frame member being pivotally connected to the first frame member at a joint such that an axis of rotation intersects the joint normal to the back side of the first frame member, and the second frame member is rotatable radially about the axis of rotation between a first position at a first elevation and a second position at a second elevation;
    an actuator connected to the first frame member and connected to the second frame member and configured to control the radial rotation of the second frame member relative to the first frame member between the first position and the second position;
    a first tubular-shaped mounting socket extending from the back side of the first frame member, through the first frame member, to the front side of the first frame member, sized and shaped to receive a back portion of a first load carrier;
    a second tubular-shaped mounting socket extending from the back side of the second frame member, through the second frame member, to the front side of the second frame member, sized and shaped to receive a back portion of a second load carrier; and
    an attachment feature on the back side of the first frame member for securing the implement to a vehicle.

2. The implement of claim 1 wherein one of the first frame member or the second frame member further comprises an elongated, curved, guide channel defining an interior pocket with a U-shaped cross-section, and the other one of the first frame member or the second frame member further comprises an elongated, curved, alignment tab having an arcuate edge, the elongated, curved, arcuate edge of the alignment tab being sized and shaped complementary to the interior pocket of the elongated curved guide channel, and sized and shaped such that the elongated, curved, arcuate edge of the alignment tab slidingly engages within the interior pocket of the elongated, curved, guide channel as the second frame member rotates between the first position and the second position.

3. The implement of claim 1 and further comprising:
    a first load carrier mounted to the first frame member and a second load carrier mounted to the second frame member.

4. The implement of claim 3 wherein at least one of the first or second load carrier is any one or more of a bale spike, a stabilizing spike, a bucket, a plow blade, and/or a fence post puller.

5. The implement of claim 1 wherein the first frame member further comprises a first mating surface disposed at a predetermined distance from the joint, and the second frame member further comprises a second mating surface disposed at the predetermined distance from the joint, and the first mating surface is sized and shaped to mate with and is complementary to the second mating surface.

6. The implement of claim 5 wherein a portion of the first mating surface, a portion of the second mating surface, or both a portion of the first mating surface and a portion of the second mating surface defines a bevel such that when the first mating surface mates with the second mating surface, a void is created at the bevel between the first mating surface and the second mating surface.

7. The implement of claim 1 wherein the actuator is a hydraulic cylinder.

8. The implement of claim 1 wherein the actuator is an electric motor.

9. The implement of claim 1 wherein the actuator is a pneumatic cylinder.

10. The implement of claim 1 wherein the actuator is a hydraulic motor.

11. The implement of claim 1 and further comprising:
a third frame member having a back side and a front side opposite the back side, the third frame member being pivotally connected to the first frame member at a second joint such that a second axis of rotation intersects the second joint normal to the back side of the first frame member, and the third frame member is rotatable radially about the second axis of rotation between a third position at a third elevation and a fourth position at a fourth elevation; and
a second actuator connected to the first frame member and connected to the third frame member and configured to control the radial rotation of the third frame member relative to the first frame member between the third position and the fourth position.

12. A method of using a vehicle supported implement for handling separate loads independently, the method comprising:
providing an implement of claim 1;
securing the first frame member of the implement to a vehicle using the attachment feature;
mounting a first load carrier to the front side of the first frame member;
mounting a second load carrier to the front side of the second frame member;
positioning the implement such that the first load carrier and the second load carrier are horizontal and elevated relative to a surface below the implement sufficient that forward and backward motion of the implement is not impeded by the surface below the implement;
rotating the second frame member to the first position at the first elevation;
moving the implement toward a second load;
engaging the second load with the second load carrier;
rotating the second frame member to the second position at the second elevation;
moving the implement toward a first load;
engaging the first load with the first load carrier; and
raising the implement vertically.

13. The method of claim 12 and further comprising:
operably connecting the actuator to a power source and controller.

14. The method of claim 12 and further comprising:
lowering the implement;
disengaging the first load from the first load carrier;
moving the implement away from the first load;
rotating the second frame member to the first position at the first elevation;
disengaging the second load from the second load carrier; and
moving the implement away from the second load.

15. A vehicle supported implement for handling separate loads independently, the implement comprising:
a first frame member having a back side and a front side opposite the back side;
a second frame member having a back side and a front side opposite the back side, the second frame member being pivotally connected to the first frame member at a joint such that the second frame member is rotatable radially between a first position at a first elevation and a second position at a second elevation;
a means for actuating radial rotation of the second frame member relative to the first frame member between the first position and the second position, the means for actuating radial rotation being connected to the first frame member and connected to the second frame member;
a first tubular-shaped mounting socket extending from the back side of the first frame member, through the first frame member, to the front side of the first frame member, sized and shaped to receive a back portion of a first load carrier;
a second tubular-shaped mounting socket extending from the back side of the second frame member, through the second frame member, to the front side of the second frame member, sized and shaped to receive a back portion of a second load carrier; and
an attachment feature on the back side of the first frame member for securing the implement to a vehicle.

* * * * *